United States Patent
Indusegaram et al.

(10) Patent No.: US 8,038,737 B2
(45) Date of Patent: Oct. 18, 2011

(54) METHOD OF MODULATING STABILITY OF SULFONATED DYE

(75) Inventors: Sutharsiny Indusegaram, Balmain (AU); Graciel Gonzaga, Balmain (AU); Simone Charlotte Vonwiller, Balmain (AU); Scott Matthew Starling, Balmain (AU); Lachlan Everett Hall, Balmain (AU); Damon Donald Ridley, Balmain (AU); Kia Silverbrook, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 244 days.

(21) Appl. No.: 12/368,306

(22) Filed: Feb. 10, 2009

(65) Prior Publication Data

US 2009/0199352 A1 Aug. 13, 2009

Related U.S. Application Data

(60) Provisional application No. 61/027,756, filed on Feb. 11, 2008.

(51) Int. Cl.
*C09B 47/04* (2006.01)

(52) U.S. Cl. ..................... 8/661; 8/680; 8/919

(58) Field of Classification Search .............. 8/661, 680, 8/919
See application file for complete search history.

(56) References Cited

U.S. PATENT DOCUMENTS

| | | | |
|---|---|---|---|
| 4,242,499 A * | 12/1980 | Allcock et al. ................ | 528/399 |
| 4,864,618 A | 9/1989 | Wright et al. | |
| 5,051,736 A | 9/1991 | Bennett et al. | |
| 5,477,012 A | 12/1995 | Sekendur | |
| 5,652,412 A | 7/1997 | Lazzouni et al. | |
| 5,661,506 A | 8/1997 | Lazzouni et al. | |
| 5,692,073 A | 11/1997 | Cass | |
| 5,852,434 A | 12/1998 | Sekendur | |
| 6,076,734 A | 6/2000 | Dougherty et al. | |
| 6,964,374 B1 | 11/2005 | Djuknic et al. | |
| 7,148,345 B2 * | 12/2006 | Vonwiller et al. ............ | 540/145 |
| 2007/0008393 A1 | 1/2007 | Vonwiller et al. | |
| 2007/0299257 A1 | 12/2007 | Vonwiller et al. | |

FOREIGN PATENT DOCUMENTS

| | | |
|---|---|---|
| GB | 2306669 A | 5/1997 |
| WO | WO 99/18487 A2 | 4/1999 |
| WO | WO 99/50787 A1 | 10/1999 |
| WO | WO 2006/015407 A1 | 2/2006 |
| WO | WO 2006/015408 A1 | 2/2006 |
| WO | WO 2006/015410 A1 | 2/2006 |
| WO | WO 2006/015415 A1 | 2/2006 |
| WO | WO 2007/002981 A1 | 1/2007 |
| WO | WO 2007/002982 A1 | 1/2007 |
| WO | WO 2008/006135 A1 | 1/2008 |
| WO | WO 2008/006136 A1 | 1/2008 |
| WO | WO 2008/006137 A1 | 1/2008 |

OTHER PUBLICATIONS

Facchin et al. Poly(organophosphazenes) containing azo dyes Macromol. Rapid Commun. 16, 211-217 (1995).*

Dymetman M., and Copperman, M., "Intelligent Paper in Electronic Publishing, Artist Imaging, and Digital Typography, Proceedings of EP '98", Mar./Apr. 1998, Springer Verlag LNCS 1375, pp. 392-406.

* cited by examiner

*Primary Examiner* — Amina Khan

(57) ABSTRACT

A method of modulating a stability of a sulfonated dye, particularly its ozonefastness is provided. The method comprises providing a salt of the dye, wherein the salt comprises at least one organic cation selected from the group consisting of:
  a first organic cation having a positive charge delocalized between a nitrogen atom and at least one other heteroatom;
  a second organic cation having a positive charge delocalized between a nitrogen atom and at least two other atoms; and
  a third organic cation of formula (A):

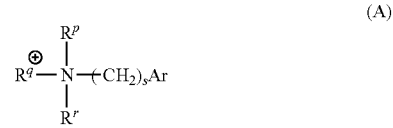

(A)

wherein:
  $R^p$, $R^q$ and $R^r$ are each independently selected from a $C_{1-6}$ alkyl group;
  s is 0, 1, 2 or 3; and
  Ar is a $C_{6-12}$ aryl group or $C_{3-12}$ heteroaryl group.

9 Claims, 3 Drawing Sheets

METHOD OF MODULATING STABILITY OF SULFONATED DYE

FIELD OF THE INVENTION

The present application relates to sulfonated dyes suitable for printing inks, such as inkjet inks. It has been developed primarily for improving the stability of such dyes in the presence of ozone, especially when such dyes are printed on paper

CO-PENDING APPLICATIONS

The following applications have been filed by the Applicant simultaneously with the present application:
IRB038US
The disclosures of these co-pending applications are incorporated herein by reference. The above applications have been identified by their filing docket number, which will be substituted with the corresponding application number, once assigned.

CROSS REFERENCES

The following patents or patent applications filed by the applicant or assignee of the present invention are hereby incorporated by cross-reference.

| | | | | |
|---|---|---|---|---|
| 10/815,621 | 10/815,635 | 10/815,647 | 11/488,162 | 10/815,636 |
| 11/041,652 | 11/041,609 | 11/041,556 | 10/815,609 | 7,204,941 |
| 7,278,727 | 10/913,380 | 7,122,076 | 7,156,289 | 09/575,197 |
| 6,720,985 | 7,295,839 | 09/722,174 | 7,068,382 | 7,094,910 |
| 7,062,651 | 6,644,642 | 6,549,935 | 6,987,573 | 6,727,996 |
| 6,760,119 | 7,064,851 | 6,290,349 | 6,428,155 | 6,785,016 |
| 6,831,682 | 6,741,871 | 6,965,439 | 10/932,044 | 6,870,966 |
| 6,474,888 | 6,724,374 | 6,788,982 | 7,263,270 | 6,788,293 |
| 6,737,591 | 09/693,514 | 10/778,056 | 10/778,061 | 11/193,482 |
| 7,055,739 | 6,830,196 | 7,182,247 | 7,082,562 | 10/409,864 |
| 7,108,192 | 10/492,169 | 10/492,152 | 10/492,168 | 10/492,161 |
| 7,308,148 | 6,957,768 | 7,170,499 | 11/856,061 | 11/672,522 |
| 11/672,950 | 11/754,310 | 12/015,507 | 7,148,345 | 12/025,746 |
| 12/025,762 | 12/025,765 | 10/407,212 | 6,902,255 | 6,755,509 |
| 7,122,076 | 7,148,345 | 11/482,990 | 11/454,899 | |

The disclosures of these co-pending applications are incorporated herein by reference.

BACKGROUND OF THE INVENTION

Chemical dyes are important compounds for a range of applications. For example, inkjet inks typically comprise at least one colorant in the form of a dye. Many dyes are charged molecules carrying either a positive or negative charge, which is balanced with a counterion. The present invention specifically relates to cationic salts of sulfonated dyes.

In the field of inkjet inks, it is important for any colorant to be stable over a prolonged period of time (e.g. at least 5 years, at least 10 years or at least 20 years). For example, it is desirable that photos printed from an inkjet printer do not fade significantly over time. Generally, it is desirable for inkjet-printed photos to behave comparably to traditional photos.

Inkjet colorants printed onto a surface may degrade via a number of mechanisms. In particular, poor stability in the presence of ozone and other atmospheric oxidants is a major drawback of many potential viable dyes. As used herein, the resistance of a dye to ozone and other atmospheric oxidants is referred to as "ozonefastness".

Some attempts to minimize the sensitivity of dyes to ozone have been made in the prior art. For example, the introduction of an impermeable barrier between the dye and the atmosphere improves the lifetime of the dye by physically limiting its exposure to ozone. Typically, this is achieved by lamination of printed material or by encapsulation of the dye molecule.

Another means for improving the lifetime of a dye is through the use of ozone scavengers, such as electron-rich olefins. Ozone scavengers may be formulated with the dye, chemically bonded to the dye or incorporated into print media so as to improve the lifetime of the dye.

IR absorbing dyes are particularly susceptible to ozone degradation. IR dyes are useful in printing inks, such as inkjet and offset inks. The present Applicant has been concerned with the development of an IR ink for use in its Netpage and Hyperlabel™ systems, which are described extensively in the cross-referenced patent applications herein.

The Netpage and Hyperlabel™ systems generally require a substrate having a coding pattern printed thereon. The coding pattern is preferably printed with an IR-absorbing ink having minimal visibility, so that it does not interfere with the visible content of the substrate. A user can interact with the substrate using an optical sensing device, which reads part of the coding pattern and generates interaction data. This interaction data is transmitted to a computer system, which uses the data to determine what action is being requested by the user. For example, a user may make handwritten input onto a form, click on a printed hyperlink, or request information relating to a product item. This input is interpreted by the computer system with reference to a page description corresponding to the printed substrate.

It is desirable for printed netpages to allow user interactions over prolonged periods of time so that they may, for example, be archived and retain their interactivity. It is therefore desirable that IR inks, used to print the coding pattern, have excellent stability and are not degraded by ozone and other atmospheric oxidants.

Likewise, it is desirable that other inks (e.g. CMYK inks) have excellent stability and are not degraded by ozone and other atmospheric oxidants.

SUMMARY OF THE INVENTION

In a first aspect, there is provided a use of a salt of a sulfonated dye for modulating a stability of said dye, wherein said salt comprises an organic cation selected from the group consisting of:

a first organic cation having a positive charge delocalized between a nitrogen atom and at least one other heteroatom;

a second organic cation having a positive charge delocalized between a nitrogen atom and at least two other atoms; and a third organic cation of formula (A):

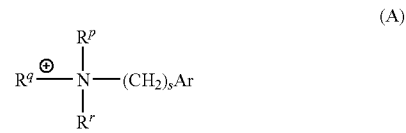

(A)

wherein:
$R^p$, $R^q$ and $R^r$ are each independently selected from a $C_{1-6}$ alkyl group;
s is 0, 1, 2 or 3; and
Ar is a $C_{6-12}$ aryl group or $C_{3-12}$ heteroaryl group.

In a second aspect, there is provided a method of modulating a stability of a sulfonated dye, said method comprising providing a salt of said dye, wherein said salt comprises wherein said salt comprises an organic cation selected from the group consisting of:
 a first organic cation having a positive charge delocalized between a nitrogen atom and at least one other heteroatom;
 a second organic cation having a positive charge delocalized between a nitrogen atom and at least two other atoms; or
 a third organic cation of formula (A):

$$R^q \overset{\oplus}{-} \underset{R^r}{\overset{R^p}{N}} - (CH_2)_s Ar \quad (A)$$

wherein:
 $R^p$, $R^q$ and $R^r$ are each independently selected from a $C_{1-6}$ alkyl group;
 s is 0, 1, 2 or 3; and
 Ar is a $C_{6-12}$ aryl group or $C_{3-12}$ heteroaryl group.

In a third aspect, there is provided a salt of a sulfonated dye, wherein said salt comprises an organic cation selected from the group consisting of:
 a first organic cation having a positive charge delocalized between a nitrogen atom and at least one other heteroatom;
 a second organic cation having a positive charge delocalized between a nitrogen atom and at least two other atoms; or
 a third organic cation of formula (A):

$$R^q \overset{\oplus}{-} \underset{R^r}{\overset{R^p}{N}} - (CH_2)_s Ar \quad (A)$$

wherein:
 $R^p$, $R^q$ and $R^r$ are each independently selected from a $C_{1-6}$ alkyl group;
 s is 0, 1, 2 or 3; and
 Ar is a $C_{6-12}$ aryl group or $C_{3-12}$ heteroaryl group.

Optionally (and particularly, for example, in respect of jurisdictions outside the United States), the salt is provided with the proviso that it is not one of the salts disclosed in US Publication No. 2008/0005855. US Publication No. 2008/0005855 describes imidazolium and DBU salts of sulfonated gallium naphthalocyanine, in which a nitrogen atom of the cation is protonated.

In a fourth aspect, there is provided a substrate having a salt according as described above disposed thereon or therein.

In a fifth aspect, there is provided a printing ink comprising a salt as described above.

In a sixth aspect, there is provided a system for interacting with a coded substrate, said system comprising:
 a substrate having human-readable information and machine-readable coded data disposed thereon or therein; and
 a sensing device for reading the machine-readable coded data,
wherein said coded data is printed with the ink described above.

In a seventh aspect, there is provided a method of initiating a requested action in a computer system via a printed substrate, the substrate containing human-readable information and machine-readable coded data, the method including the steps of:

positioning a sensing device in an operative position relative to the substrate;
 sensing at least some of the coded data;
 generating indicating data in the sensing device using at least some of the sensed coded data, said indicating data enabling the computer to identify the requested action; and
 sending the indicating data to the computer system,
wherein said coded data is printed with the ink described above.

Any of the first, second, third, fourth, fifth, sixth or seventh aspects of the present inventions are provided with the following optional embodiments:

Optionally, the positive charge is delocalized a nitrogen atom and at least four other atoms.

Optionally, the at least one other heteroatom is selected from the group comprising: N, S and P Optionally, the first and second organic cations lack any alkyl groups having a length of more than 6 atoms.

Optionally, the first or second organic cations are selected from the group consisting of:
 imidazole cations; benzimidazole cations; thiazole cations; thiabendazole cations; guanidine cations; phosphazene cations; hexidine cations and di($C_{1-6}$ alkyl)aminopyridine cations.

Optionally, the second organic cation is selected from the group consisting of:
 imidazole cations; benzimidazole cations; thiazole cations; thiabendazole cations; guanidine cations; phosphazene cations; hexidine cations; and pyridine cations.

Optionally, the organic cation is selected from the group consisting of: imidazole cations and phosphazene cations. Specific examples of such cations are described herein, with reference to generic structural formulae (B) and (C).

Optionally, the nitrogen atom does not bear any hydrogen atoms, in contrast with all cations disclosed in US Publication No. 2008/0005855.

Optionally, the ozonefastness of the dye is improved compared to other cations falling outside the scope of the present invention.

Optionally, the dye is disposed on or in a substrate.

Optionally, the dye is printed onto a print medium, which may be, for example, paper.

Optionally, the dye is a phthalocyanine dye.

Optionally, the dye is an IR-absorbing dye, which dyes are known to have generally poor ozonefastness.

Optionally, the salt is of formula (I):

$$(I)$$

[Structure of phthalocyanine with central M, four Q groups ($Q^1$, $Q^2$, $Q^3$, $Q^4$) and four $SO_3^- Z^+$ groups ($SO_3^- Z_1^+$, $SO_3^- Z_2^+$, $SO_3^- Z_3^+$, $SO_3^- Z_4^+$)]

wherein:
$Q^1$, $Q^2$, $Q^3$ and $Q^4$ are the same or different and are independently selected from a $C_{3-20}$ arylene group or a $C_{3-20}$ heteroarylene group;

M is (H$_2$) or a metal selected from the group comprising: Si(A$^1$)(A$^2$), Ge(A$^1$)(A$^2$), Ga(A$^1$), Mg, Al(A$^1$), TiO, Ti(A$^1$)(A$^2$), ZrO, Zr(A$^1$)(A$^2$), VO, V(A$^1$)(A$^2$), Mn, Mn(A$^1$), Fe, Fe(A$^1$), Co, Ni, Cu, Zn, Sn, Sn(A$^1$)(A$^2$), Pb, Pb(A$^1$)(A$^2$), Pd and Pt;

A$^1$ and A$^2$ are axial ligands, which may be the same or different, and are selected from the group comprising: —OH, halogen, —OR$^3$, —OC(O)R$^4$ and —O(CH$_2$CH$_2$O)$_e$R$^e$ wherein e is an integer from 2 to 10 and R$^e$ is H, C$_{1-8}$ alkyl or C(O)C$_{1-8}$ alkyl;

R$^3$ is C$_{1-20}$ alkyl, C$_{5-12}$ aryl, C$_{5-20}$ arylalkyl or Si(R$^x$)(R$^y$)(R$^z$);
R$^4$ is C$_{1-20}$ alkyl, C$_{5-12}$ aryl or C$_{5-20}$ arylalkyl;
R$^x$, R$^y$ and R$^z$ are the same or different and are selected from C$_{1-12}$ alkyl, C$_{5-12}$ aryl, C$_{5-12}$ arylalkyl, C$_{1-12}$ alkoxy, C$_{5-12}$ aryloxy or C$_{5-12}$ arylalkoxy; and
Z$_1^+$, Z$_2^+$, Z$_3^+$ and Z$_4^+$ may be the same or different and are each an organic cation as defined above.

Optionally, the salt is of formula (II):

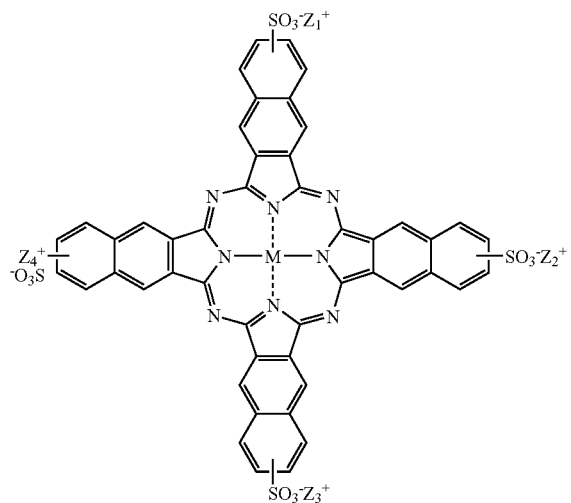

(II)

wherein
M is (H$_2$) or a metal selected from the group comprising: Si(A$^1$)(A$^2$), Ge(A$^1$)(A$^2$), Ga(A$^1$), Mg, Al(A$^1$), TiO, Ti(A$^1$)(A$^2$), ZrO, Zr(A$^1$)(A$^2$), VO, V(A$^1$)(A$^2$), Mn, Mn(A$^1$), Fe, Fe(A$^1$), Co, Ni, Cu, Zn, Sn, Sn(A$^1$)(A$^2$), Pb, Pb(A$^1$)(A$^2$), Pd and Pt;

A$^1$ is an axial ligand selected from —OH, halogen, —OR$^3$, —OC(O)R$^4$ or O(CH$_2$CH$_2$O)$_e$R$^e$ wherein e is an integer from 2 to 10 and R$^e$ is H, C$_{1-8}$ alkyl or C(O)C$_{1-8}$ alkyl;

R$^3$ is selected from C$_{1-12}$ alkyl, C$_{5-12}$ aryl, C$_{5-12}$ arylalkyl or Si(R$^x$)(R$^y$)(R$^z$);
R$^4$ is selected from C$_{1-12}$ alkyl, C$_{5-12}$ aryl or C$_{5-12}$ arylalkyl;
R$^x$, R$^y$ and R$^z$ may be the same or different and are selected from C$_{1-12}$ alkyl, C$_{5-12}$ aryl, C$_{5-12}$ arylalkyl, C$_{1-12}$ alkoxy, C$_{5-12}$ aryloxy or C$_{5-12}$ arylalkoxy; and
Z$_1^+$, Z$_2^+$, Z$_3^+$ and Z$_4^+$ may be the same or different and are each an organic cation as defined above.

DETAILED DESCRIPTION

Sulfonated Dye Salts

Figure 1:
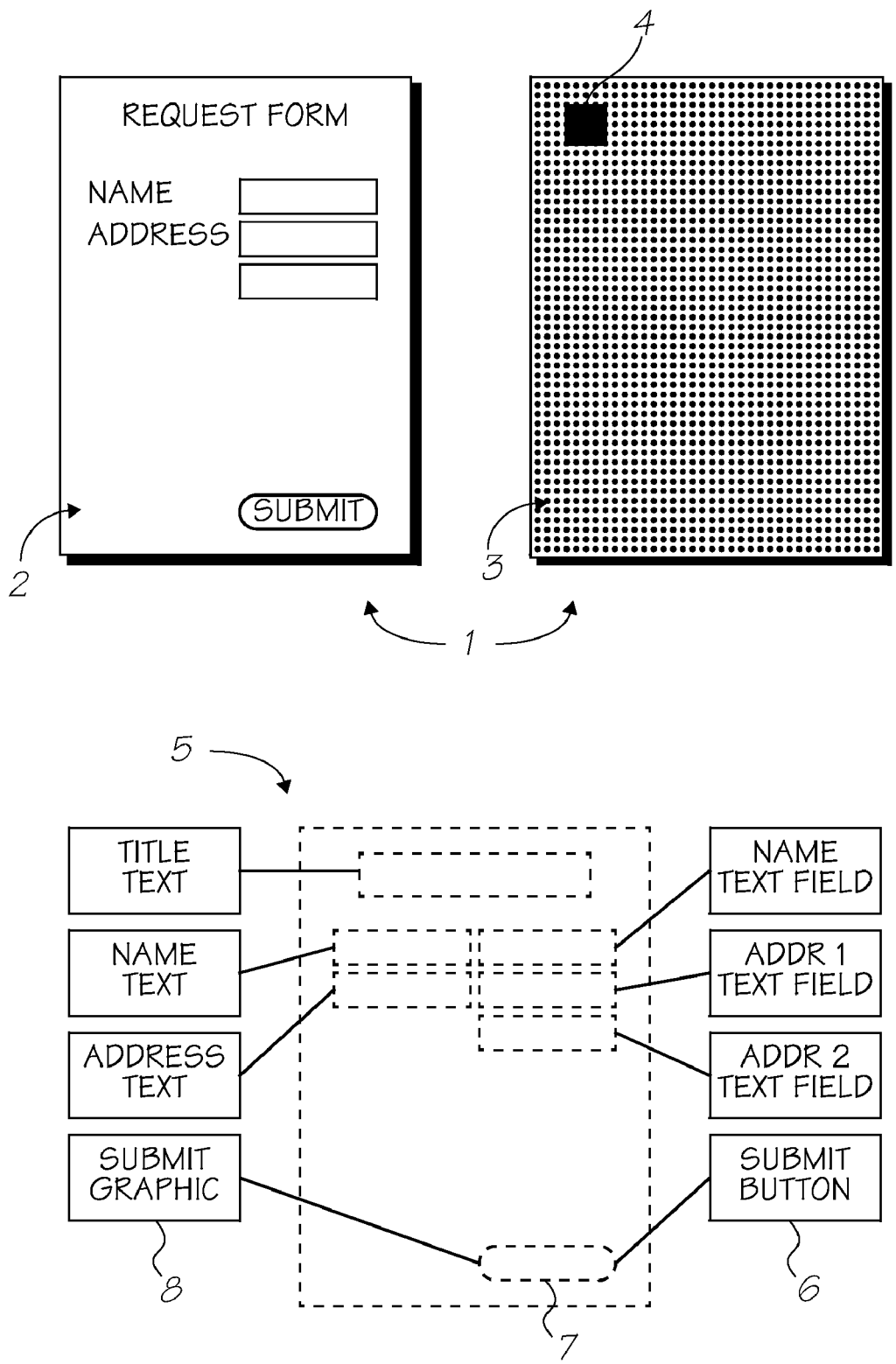
FIG. 1 is a schematic of a the relationship between a sample printed netpage and its online page description.

As used herein, the term "sulfonated dye" refers to any dye molecule bearing a sulfonate group. Sulfonated dyes are a well-known class of compound. Examples of some commercially available sulfonated dyes are Food Black 1 (Brilliant Black BN), Food Black 2 (Black 7984), Allura Red AC, Amaranth, Amido Black, Food Red 3 (Azorubine), Food Brown 3 (Brown HT), Chrysoine resorcinol (Resorcinol Yellow), Congo Red, Food Yellow 2 (Fast Yellow), Hydroxynaphthol Blue, Lithol Rubine BK, Pigment Rubine, Orange B, Orange G, Orange GGN, Food Red 7, Acid Red 1 (Red 2G), Food Red 2, Orange Yellow S, Sunset Yellow, tartrazine, Yellow 2G, Food Blue 2, Food Green S, Food Green 2, Food Blue 5, and sulfonated phthalocyanines (e.g. copper phthalocyanine, Aldrich Catalogue No. 41,205-8). The Applicant has previously described sulfonated phthalocyanine IR dyes, such as sulfonated naphthalocyanines (see U.S. Pat. Nos. 7,148,345 and 7,122,076).

As used herein, the term "phthalocyanine" refers to any compound belonging to the general class of macrocyclic phthalocyanines, and includes naphthalocyanines, quinolinephthalocyanines etc, as well as substituted derivatives thereof.

As used herein, the term "IR-absorbing dye" means a substance, which absorbs infrared radiation and which is therefore suitable for detection by an infrared sensor. Preferably, the IR-absorbing dye absorbs in the near infrared region, and preferably has a $\square_{max}$ in the range of 700 to 1000 nm, more preferably 750 to 900 nm, more preferably 780 to 850 nm. Dyes having a $\square_{max}$ in this range are particularly suitable for detection by semiconductor lasers, such as a gallium aluminium arsenide diode laser.

Typically in the prior art, sulfonated dyes are provided in their salt form. The usual salts of sulfonated dyes are sodium salts, lithium salts, potassium salts and calcium salts. Such salts are inexpensive, readily soluble in aqueous-based media and easy to prepare.

In WO2008/006137 (US Publication No. 2008/0005855), the present Applicant described other cationic salts of gallium napthalocyanine tetrasulfonate. The cations comprise a conjugate acid of an organic base, such as the conjugate acid of imidazole or pyridine. Such salts were developed specifically to reduce visibility of these IR dyes. It is believed that protonation of the phthalocyanine ring by the weakly acidic cation reduces $\square\square$ stacking between adjacent dye molecules and, hence, reduces visible absorption by aggregated dye molecules.

Generally, the ozonefastness of sulfonated dyes was believed to be attributable primarily to the structure and reactivity of the dye chromophore. This is a reasonable assumption, because the integrity of the dye chromophore is, of course, crucial to the performance of the dye. Hence, different dye molecules are expected to have varying stability in the presence of ozone and other atmospheric oxidants.

It is indeed the case that the structure of the dye chromophore has a significant effect on dye stability. However, the present Applicants have now found that the nature of the cationic salt also has a marked effect on dye stability, and in particular ozonefastness. By selecting the cationic salt in accordance with certain criteria, it has been found that the ozonefastness of sulfonated dyes can be modulated.

Improved ozonefastness has been observed when the dyes are printed onto paper, such as plain paper or microporous paper.

The Applicant's interest in the development of IR dyes for netpage and Hyperlabel™ has provided a plethora of examples whereby certain cations have been shown to improve the ozonefastness of gallium naphthalocyanine tetrasulfonate printed on paper. However, studies of other sulfonated dye molecules have shown that the present invention is not confined to this particular class of dyes. For example, the sulfonated dye Food Black 2 (or "Black 7984"), has shown improved ozonefastness when used as a salt according to the present invention. Other sulfonated dyes also exhibit improved ozonefastness when used as salts according to the present invention.

The types of cation shown to provide improved ozonefastness is not particularly limited provided that certain criteria are met.

One class of organic cation used in the present invention has a positive charge delocalized between a nitrogen atom and at least one other heteroatom. The at least one other heteroatom may be a nitrogen, sulfur or phosphorus atom. Examples of such cations are exemplified below:

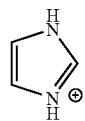
(2)

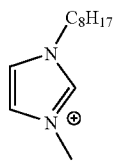
(4)

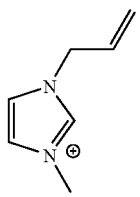
(5)

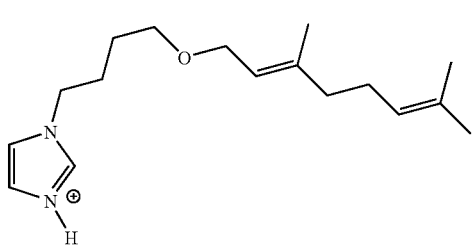
(8)

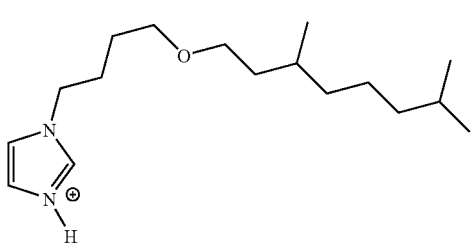
(11)

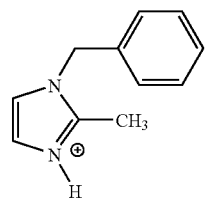
(12)

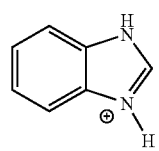
(13)

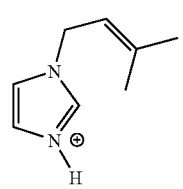
(15)

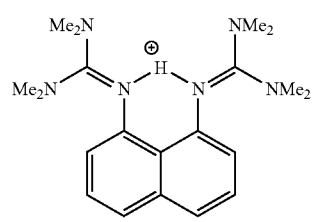
(16)

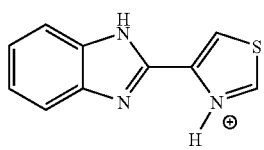
(17)

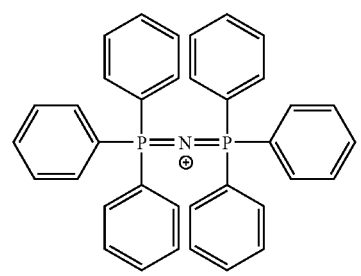
(18)

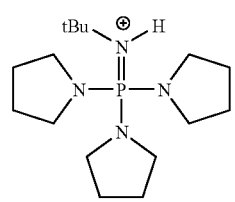
(19)

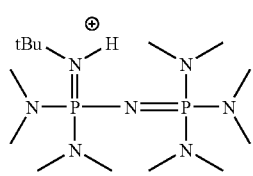
(20)

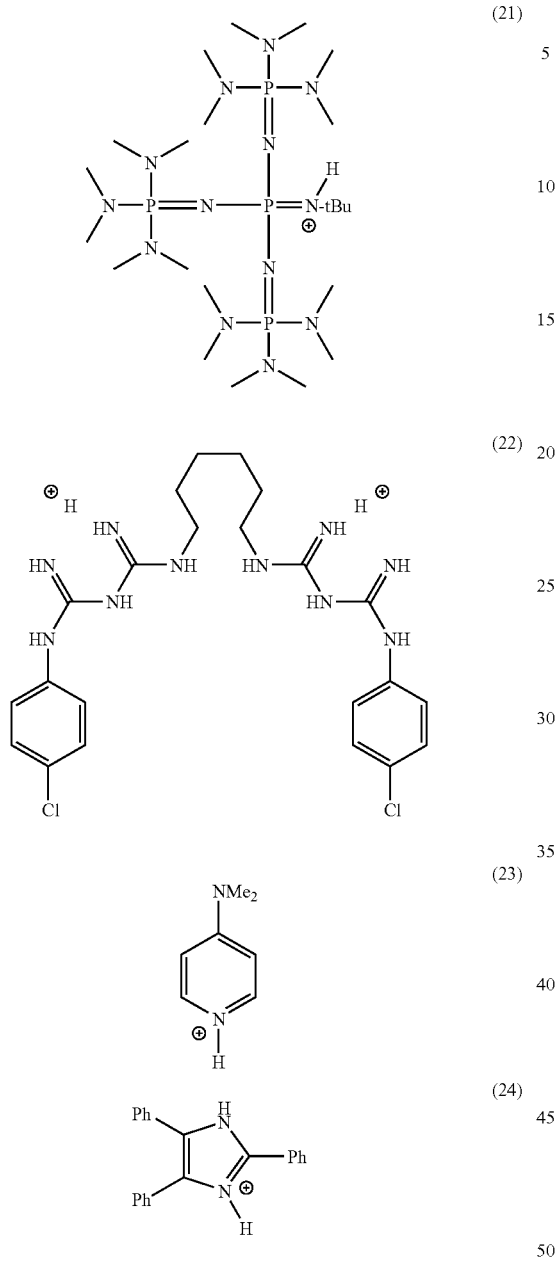
Another class of organic cation used in the present invention has a positive charge delocalized between a nitrogen atom and at least two other atoms. Generally, the organic cation lacks an alkyl chain having more than 6 carbon atoms. Examples of such cations are exemplified below:
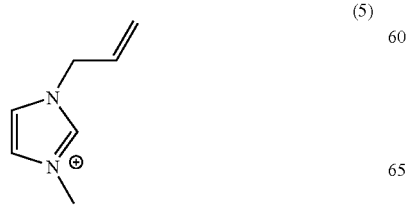

-continued

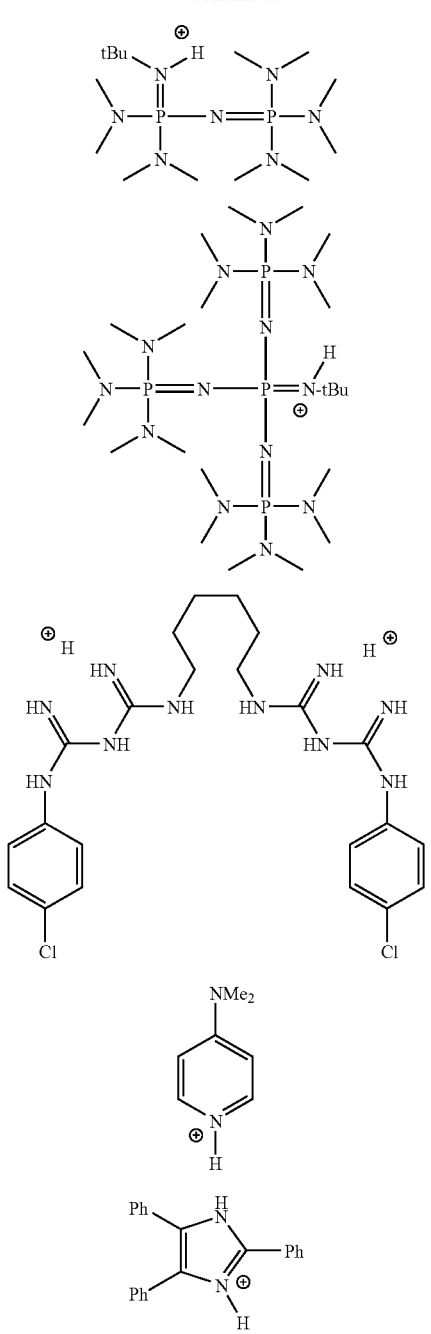

(20)

(21)

(22)

(23)

(24)

Another class of organic cation used in the present invention is of formula (I):

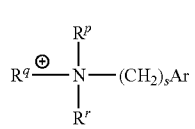

(A)

wherein:
$R^p$, $R^q$ and $R^r$ are each independently selected from a $C_{1-6}$ alkyl group (preferably $R^p$, $R^q$ and $R^r$ are all methyl groups); s is 0, 1, 2 or 3 (preferably s is 1); and Ar is a $C_{6-12}$ aryl group or $C_{6-12}$ heteroaryl group (preferably a phenyl group).

Organic cations according to formula (A) are exemplified by the cation (3).

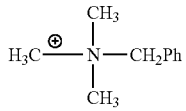

(3)

As mentioned above, the organic cation may be an imidazole cation. Such imidazole cations are exemplified by cations of the formula (B):

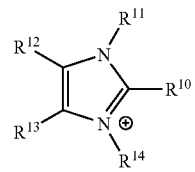

(B)

wherein:
$R^{10}$, $R^{11}$, $R^{12}$, $R^{13}$ and $R^{14}$ are each independently selected from H, $C_{1-16}$ alkyl, $C_{6-12}$ aryl, $C_{5-12}$ heteroaryl, $C_{7-16}$ aralkyl and $C_{6-16}$ heteroarylalkyl; and/or
$R^{12}$ and $R^{13}$ may together be joined to form a $C_{5-12}$ cycloalkylene, $C_{6-12}$ arylene or $C_{5-12}$ heteroarylene group.
Optionally, $R^{11}$ and $R^{14}$ are each independently select from H, $C_{1-6}$ alkyl, $C_{7-16}$ arylalkyl and $C_{6-16}$ heteroarylalkyl.
Optionally $R^{10}$, $R^{12}$ and $R^{13}$ are each independently selected from H, $C_{1-6}$ alkyl, $C_{6-12}$ aryl and $C_{5-12}$ heteroaryl (e.g. thiazole).
Optionally, $R^{12}$ and $R^{13}$ are together joined to form a $C_{4-10}$ arylene group.

As mentioned above, the organic cation may be a phosphazene cation. Such phosphazene cations are exemplified by cations of formula (C):

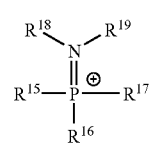

(C)

wherein:
$R^{15}$, $R^{16}$ and $R^{17}$ are each independently selected from $C_{6-12}$ aryl (e.g. phenyl), $C_{5-12}$ heteroaryl; $N(R^{20})(R^{21})$ and $-N=P[N(R^{22})_2]_3$;
$R^{18}$ and $R^{19}$ are each independently selected from H and $C_{1-8}$ alkyl; or $R^{18}$ and $R^{19}$ are together: $=P(Ph)_3$;
$R^{20}$ and $R^{21}$ are each independently selected from H and $C_{1-8}$ alkyl; or $R^{20}$ and $R^{21}$ are together joined to form a nitrogen-containing $C_{5-10}$ heterocycloalkyl group (e.g. pyrrolidinyl or piperidinyl); and
$R^{22}$ is $C_{1-6}$ alkyl.

Sulfonate dye salts comprising any of the cations exemplified above have excellent ozonefastness.

In the most general form of the present invention, the dye may be any sulfonated dye, such as those commonly used in printing inks. These include Food dyes, sulfonated phthalocyanines, sulfonated azo dyes and the like.

The present invention has been shown to work particularly well with sulfonated phthalocyanines, which include sulfonated naphthalocyanines. Sulfonated phthalocyanine dyes may be metal-free or may comprise a central metal atom moiety M. Optionally, M is selected from $Si(A^1)(A^2)$, $Ge(A^1)(A^2)$, $Ga(A^1)$, Mg, $Al(A^1)$, TiO, $Ti(A^1)(A^2)$, ZrO, $Zr(A^1)(A^2)$, VO, $V(A^1)(A^2)$, Mn, $Mn(A^1)$, Fe, $Fe(A^1)$, Co, Ni, Cu, Zn, Sn, $Sn(A^1)(A^2)$, Pb, $Pb(A^1)(A^2)$, Pd and Pt. Phthalocyanines having a range of central metal atom moieties are well known in the literature (see, for example, Aldrich Catalogue). Sulfonation of phthalocyanines is readily achievable using standard sulfonation chemistry.

Optionally, M is selected from $Si(A^1)(A^2)$, $Ge(A^1)(A^2)$, $Ga(A^1)$, $Al(A^1)$, VO, Mn, $Mn(A^1)$, Cu, Zn, Sn, and $Sn(A^1)(A^2)$.

Optionally, M is $Ga(A^1)$.

$A^1$ and $A^2$ are axial ligands, which may be the same or different. Optionally, $A^1$ and $A^2$ and are selected from —OH, halogen or —$OR^3$. Optionally, $A^1$ and $A^2$ may be —$OC(O)R^4$ or —$O(CH_2CH_2O)_eR^e$ wherein e is an integer from 2 to 10 and $R^e$ is H, $C_{1-8}$ alkyl or —$C(O)C_{1-8}$ alkyl Typically $A^1$ is a hydroxyl group (—OH).

$R^3$ may be $C_{1-20}$ alkyl, $C_{5-12}$ aryl, $C_{5-20}$ arylalkyl or $Si(R^x)(R^y)(R^z)$.

$R^4$ may be $C_{1-20}$ alkyl, $C_{5-12}$ aryl or $C_{5-20}$ arylalkyl.

$R^x$, $R^y$ and $R^z$ may be the same or different and are selected from $C_{1-12}$ alkyl, $C_{5-12}$ aryl, $C_{5-12}$ arylalkyl, $C_{1-12}$ alkoxy, $C_{5-12}$ aryloxy or $C_{5-12}$ arylalkoxy.

An example of a sulfonated phthalocyanine dye salt, which may be used in the present invention is shown in formula (I):

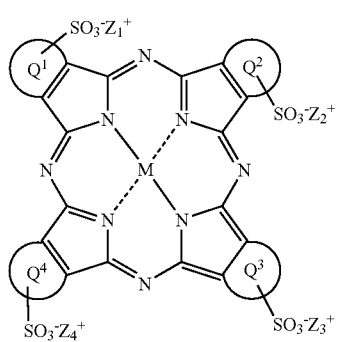

(I)

wherein:
$Q^1$, $Q^2$, $Q^3$ and $Q^4$ are the same or different and are independently selected from a $C_{3-20}$ arylene group or a $C_{3-20}$ heteroarylene group;
M is ($H_2$) or a metal selected from the group comprising: $Si(A^1)(A^2)$, $Ge(A^1)(A^2)$, $Ga(A^1)$, Mg, $Al(A^1)$, TiO, $Ti(A^1)(A^2)$, ZrO, $Zr(A^1)(A^2)$, VO, $V(A^1)(A^2)$, Mn, $Mn(A^1)$, Fe, $Fe(A^1)$, Co, Ni, Cu, Zn, Sn, $Sn(A^1)(A^2)$, Pb, $Pb(A^1)(A^2)$, Pd and Pt;
$A^1$ and $A^2$ are axial ligands, which may be the same or different, and are selected from the group comprising: OH, halogen, $OR^3$, —$OC(O)R^4$, —$O(CH_2CH_2O)_eR_e$ wherein e is an integer from 2 to 10 and $R^e$ is H, $C_{1-8}$ alkyl or $C(O)C_{1-8}$ alkyl;
$R^3$ is $C_{1-20}$ alkyl, $C_{5-12}$ aryl, $C_{5-20}$ arylalkyl or $Si(R^x)(R^y)(R^z)$;
$R^4$ is $C_{1-20}$ alkyl, $C_{5-12}$ aryl or $C_{5-20}$ arylalkyl;
$R^x$, $R^y$ and $R^z$ are the same or different and are selected from $C_{1-12}$ alkyl, $C_{5-12}$ aryl, $C_{5-12}$ arylalkyl, $C_{1-12}$ alkoxy, $C_{5-12}$ aryloxy or $C_{5-12}$ arylalkoxy; and $Z_1^+$, $Z_2^+$, $Z_3^+$ and $Z_4^+$ may be the same or different and are each an organic cation as described above.

The general synthesis of phthalocyanines in accordance with formula (I) are described in, for example, the Applicant's earlier U.S. Pat. Nos. 7,148,345 and 7,122,076, the contents of which are herein incorporated by reference. Specific salt syntheses are described hereinbelow.

Optionally, the groups represented as $Q^1$, $Q^2$, $Q^3$ and $Q^4$ are each selected from an arylene group of formula (i) or (ii) below:

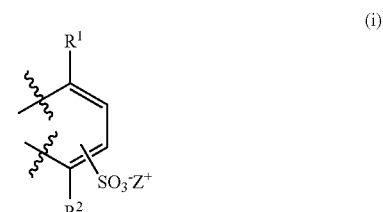

(i)

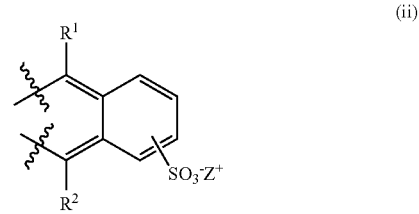

(ii)

wherein:
$R^1$ and $R^2$ may be the same or different and are selected from hydrogen, hydroxyl, $C_{1-12}$ alkyl, $C_{1-12}$ alkoxy, amino, $C_{1-12}$ alkylamino, di($C_{1-12}$ alkyl)amino, halogen, cyano, thiol, $C_{1-12}$ alkylthio, $C_{5-12}$ arylthio, nitro, carboxy, $C_{1-12}$ alkylcarbonyl, $C_{1-12}$ alkoxycarbonyl, $C_{1-12}$ alkylcarbonyloxy or $C_{1-12}$ alkylcarbonylamino; and $Z^+=Z_1^+=Z_2^+=Z_3^+=Z_4^+$. Optionally, $R^1$ and $R^2$ are selected from hydrogen and $C_{1-6}$ alkyl.

A more specific example of a sulfonated dye salt, which may be used in the present invention is the sulfonated naphthalocyanine salt shown in formula (II):

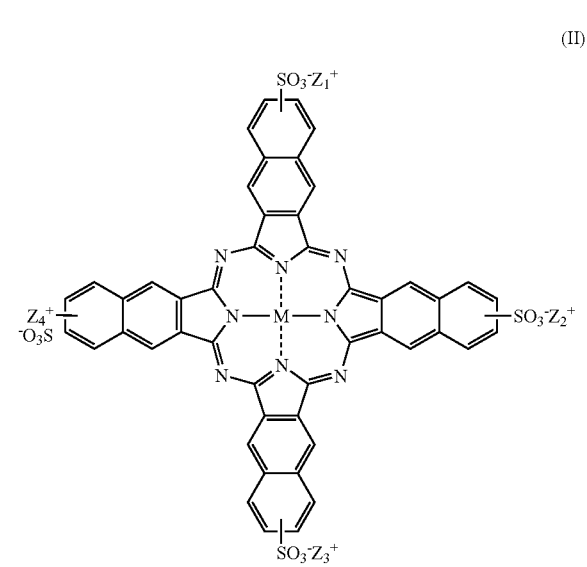

(II)

wherein

M is (H$_2$) or a metal selected from the group comprising: Si(A$^1$)(A$^2$), Ge(A$^1$)(A$^2$), Ga(A$^1$), Mg, Al(A$^1$), TiO, Ti(A$^1$)(A$^2$), ZrO, Zr(A$^1$)(A$^2$), VO, V(A$^1$)(A$^2$), Mn, Mn(A$^1$), Fe, Fe(A$^1$), Co, Ni, Cu, Zn, Sn, Sn(A$^1$)(A$^2$), Pb, Pb(A$^1$)(A$^2$), Pd and Pt;

A$^1$ is an axial ligand selected from OH, halogen, —OR$^3$, —OC(O)R$^4$, —O(CH$_2$CH$_2$O)$_e$R$^e$ wherein e is an integer from 2 to 10 and R$^e$ is H, C$_{1-8}$ alkyl or C(O)C$_{1-8}$ alkyl;

R$^3$ is selected from C$_{1-12}$ alkyl, C$_{5-12}$ aryl, C$_{5-12}$ arylalkyl or Si(R$^x$)(R$^y$)(R$^z$);

R$^4$ is selected from C$_{1-12}$ alkyl, C$_{5-12}$ aryl or C$_{5-12}$ arylalkyl;

R$^x$, R$^y$ and R$^z$ may be the same or different and are selected from C$_{1-12}$ alkyl, C$_{5-12}$ aryl, C$_{5-12}$ arylalkyl, C$_{1-12}$ alkoxy, C$_{5-12}$ aryloxy or C$_{5-12}$ arylalkoxy; and Z$_1^+$, Z$_2^+$, Z$_3^+$ and Z$_4^+$ may be the same or different and are each an organic cation as described above.

Typically, Z$_1^+$=Z$_2^+$=Z$_3^+$=Z$_4^+$.

Optionally, M is Ga(OH).

The term "aryl" is used herein to refer to an aromatic group, such as phenyl, naphthyl or triptycenyl. C$_{6-12}$ aryl, for example, refers to an aromatic group having from 6 to 12 carbon atoms, excluding any substituents. The term "arylene", of course, refers to divalent groups corresponding to the monovalent aryl groups described above. Any reference to aryl implicitly includes arylene, where appropriate.

The term "heteroaryl" refers to an aryl group, where 1, 2, 3 or 4 carbon atoms are replaced by a heteroatom selected from N, O or S. Examples of heteroaryl (or heteroaromatic) groups include pyridyl, benzimidazolyl, indazolyl, quinolinyl, isoquinolinyl, indolinyl, isoindolinyl, indolyl, isoindolyl, pyrrolyl, imidazolyl, oxazolyl, imidazole, benzimidazole, isoxazolyl, pyrazolyl, isoxazolonyl, piperazinyl, pyrimidinyl, pyridyl, pyrimidinyl, benzopyrimidinyl, benzotriazole, quinoxalinyl, pyridazyl, thiazole, thiabendazole etc. The term "heteroarylene", of course, refers to divalent groups corresponding to the monovalent heteroaryl groups described above. Any reference to heteroaryl implicitly includes heteroarylene, where appropriate.

Unless specifically stated otherwise, aryl and heteroaryl groups may be optionally substituted with 1, 2, 3, 4 or 5 of the substituents described below. The optional substituent(s) are independently selected from C$_{1-8}$ alkyl, C$_{1-8}$ alkoxy, —(OCH$_2$CH$_2$)$_d$OR$^d$ (wherein d is an integer from 2 to 5000 and R$^d$ is H, C$_{1-8}$ alkyl or C(O)C$_{1-8}$ alkyl), cyano, halogen, amino, hydroxyl, thiol, —SR$^v$, —NR$^u$R$^v$, nitro, phenyl, phenoxy, —CO$_2$R$^v$, —C(O)R$^v$, —OCOR$^v$, SO$_2$R$^v$, SO$_2$R$^v$, —SO$_2$OR$^v$, —NHC(O)R$^v$, —CONR$^u$R$^v$, —CONR$^u$R$^v$, —SO$_2$NR$^u$R$^v$, wherein R$^u$ and R$^v$ are independently selected from hydrogen, C$_{1-12}$ alkyl, phenyl or phenyl-C$_{1-8}$ alkyl (e.g. benzyl). Where, for example, a group contains more than one substituent, different substituents can have different R$^u$ or R$^v$ groups. For example, a naphthyl group may be substituted with three substituents: —SO$_2$NHPh, ~CO$_2$Me group and —NH$_2$.

The term "alkyl" is used herein to refer to alkyl groups in both straight and branched forms. Unless stated otherwise, the alkyl group may be interrupted with 1, 2, 3 or 4 heteroatoms selected from O, NH or S. Unless stated otherwise, the alkyl group may also be interrupted with 1, 2 or 3 double and/or triple bonds. However, the term "alkyl" usually refers to alkyl groups having double or triple bond interruptions. Where "alkenyl" groups are specifically mentioned, this is not intended to be construed as a limitation on the definition of "alkyl" above.

Where reference is made to, for example, C$_{1-20}$ alkyl, it is meant the alkyl group may contain any number of carbon atoms between 1 and 20. Unless specifically stated otherwise, any reference to "alkyl" means C$_{1-20}$ alkyl, preferably C$_{1-12}$ alkyl or C$_{1-6}$ alkyl.

The term "alkyl" also includes cycloalkyl groups. As used herein, the term "cycloalkyl" includes cycloalkyl, polycycloalkyl, and cycloalkenyl groups, as well as combinations of these with linear alkyl groups, such as cycloalkylalkyl groups. The cycloalkyl group may be interrupted with 1, 2 or 3 heteroatoms selected from O, N or S and may be specifically indicated as a heterocycloalkyl group. Examples of heterocycloalkyl groups are pyrrolidino, morpholino, piperidino etc. However, the term "cycloalkyl" usually refers to cycloalkyl groups having no heteroatom interruptions. Examples of cycloalkyl groups include cyclopentyl, cyclohexyl, cyclohexenyl, cyclohexylmethyl and adamantyl groups.

The term "arylalkyl" refers to groups such as benzyl, phenylethyl and naphthylmethyl.

The term "halogen" or "halo" is used herein to refer to any of fluorine, chlorine, bromine and iodine. Usually, however, halogen refers to chlorine or fluorine substituents.

Any chiral compounds described herein have not been given stereo-descriptors. However, when compounds may exist in stereoisomeric forms, then all possible stereoisomers and mixtures thereof are included (e.g. enantiomers, diastereomers and all combinations including racemic mixtures etc.).

Likewise, when compounds may exist in a number of regioisomeric forms, then all possible regioisomers and mixtures thereof are included.

For the avoidance of doubt, the term "a" (or "an"), in phrases such as "comprising a", means "at least one" and not "one and only one". Where the term "at least one" is specifically used, this should not be construed as having a limitation on the definition of "a".

Throughout the specification, the term "comprising", or variations such as "comprise" or "comprises", should be construed as including a stated element, integer or step, but not excluding any other element, integer or step.

Inks

The dye salts described above may be formulated in inkjet inks. Preferably, the inkjet ink is a water-based inkjet ink.

Water-based inkjet ink compositions are well known in the literature and, in addition to water, may comprise additives, such as co-solvents, biocides, sequestering agents, humectants, viscosity modifiers, penetrants, wetting agents, surfactants etc.

Co-solvents are typically water-soluble organic solvents. Suitable water-soluble organic solvents include C$_{1-4}$ alkyl alcohols, such as ethanol, methanol, butanol, propanol, and 2-propanol; glycol ethers, such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-isopropyl ether, diethylene glycol mono-isopropyl ether, ethylene glycol mono-n-butyl ether, diethylene glycol mono-n-butyl ether, triethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-isopropyl ether, dipropylene glycol monomethyl ether, dipropylene glycol monoethyl ether, dipropylene glycol mono-n-propyl ether, dipropylene glycol mono-isopropyl ether, propylene glycol mono-n-butyl ether, and dipropylene glycol mono-n-butyl ether; formamide, acetamide, dimethyl sulfoxide, sorbitol, sorbitan, glycerol monoacetate, glycerol diacetate, glycerol triacetate, and sulfolane; or combinations thereof.

Other useful water-soluble organic solvents include polar solvents, such as 2-pyrrolidone, N-methylpyrrolidone, □-caprolactam, dimethyl sulfoxide, sulfolane, morpholine, N-ethylmorpholine, 1,3-dimethyl-2-imidazolidinone and combinations thereof.

The inkjet ink may contain a high-boiling water-soluble organic solvent which can serve as a wetting agent or humectant for imparting water retentivity and wetting properties to the ink composition. Such a high-boiling water-soluble organic solvent includes one having a boiling point of 180° C. or higher. Examples of the water-soluble organic solvent having a boiling point of 180° C. or higher are ethylene glycol, propylene glycol, diethylene glycol, pentamethylene glycol, trimethylene glycol, 2-butene-1,4-diol, 2-ethyl-1,3-hexanediol, 2-methyl-2,4-pentanediol, tripropylene glycol monomethyl ether, dipropylene glycol monoethyl glycol, dipropylene glycol monoethyl ether, dipropylene glycol monomethyl ether, dipropylene glycol, triethylene glycol monomethyl ether, tetraethylene glycol, triethylene glycol, diethylene glycol monobutyl ether, diethylene glycol monoethyl ether, diethylene glycol monomethyl ether, tripropylene glycol, polyethylene glycols having molecular weights of 2000 or lower, 1,3-propylene glycol, isopropylene glycol, isobutylene glycol, 1,4-butanediol, 1,3-butanediol, 1,5-pentanediol, 1,6-hexanediol, glycerol, erythritol, pentaerythritol and combinations thereof.

The total water-soluble organic solvent content in the inkjet ink is preferably about 5 to 50% by weight, more preferably 10 to 30% by weight, based on the total ink composition.

Other suitable wetting agents or humectants include saccharides (including monosaccharides, oligosaccharides and polysaccharides) and derivatives thereof (e.g. maltitol, sorbitol, xylitol, hyaluronic salts, aldonic acids, uronic acids etc.)

The inkjet ink may also contain a penetrant for accelerating penetration of the aqueous ink into the recording medium. Suitable penetrants include polyhydric alcohol alkyl ethers (glycol ethers) and/or 1,2-alkyldiols. Examples of suitable polyhydric alcohol alkyl ethers are ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, ethylene glycol mono-n-propyl ether, ethylene glycol mono-isopropyl ether, diethylene glycol mono-isopropyl ether, ethylene glycol mono-n-butyl ether, diethylene glycol mono-n-butyl ether, triethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-isopropyl ether, dipropylene glycol monomethyl ether, dipropylene glycol monoethyl ether, dipropylene glycol mono-n-propyl ether, dipropylene glycol mono-isopropyl ether, propylene glycol mono-n-butyl ether, and dipropylene glycol mono-n-butyl ether. Examples of suitable 1,2-alkyldiols are 1,2-pentanediol and 1,2-hexanediol. The penetrant may also be selected from straight-chain hydrocarbon diols, such as 1,3-propanediol, 1,4-butanediol, 1,5-pentanediol, 1,6-hexanediol, 1,7-heptanediol, and 1,8-octanediol. Glycerol or urea may also be used as penetrants.

The amount of penetrant is preferably in the range of 1 to 20% by weight, more preferably 1 to 10% by weight, based on the total ink composition.

The inkjet ink may also contain a surface active agent, especially an anionic surface active agent and/or a nonionic surface active agent. Useful anionic surface active agents include sulfonic acid types, such as alkanesulfonic acid salts, □-olefinsulfonic acid salts, alkylbenzenesulfonic acid salts, alkylnaphthalenesulfonic acids, acylmethyltaurines, and dialkylsulfosuccinic acids; alkylsulfuric ester salts, sulfated oils, sulfated olefins, polyoxyethylene alkyl ether sulfuric ester salts; carboxylic acid types, e.g., fatty acid salts and alkylsarcosine salts; and phosphoric acid ester types, such as alkylphosphoric ester salts, polyoxyethylene alkyl ether phosphoric ester salts, and glycerophosphoric ester salts. Specific examples of the anionic surface active agents are sodium dodecylbenzenesulfonate, sodium laurate, and a polyoxyethylene alkyl ether sulfate ammonium salt.

Suitable nonionic surface active agents include ethylene oxide adduct types, such as polyoxyethylene alkyl ethers, polyoxyethylene alkylphenyl ethers, polyoxyethylene alkyl esters, and polyoxyethylene alkylamides; polyol ester types, such as glycerol alkyl esters, sorbitan alkyl esters, and sugar alkyl esters; polyether types, such as polyhydric alcohol alkyl ethers; and alkanolamide types, such as alkanolamine fatty acid amides. Specific examples of nonionic surface active agents are ethers such as polyoxyethylene nonylphenyl ether, polyoxyethylene octylphenyl ether, polyoxyethylene dodecylphenyl ether, polyoxyethylene alkylallyl ether, polyoxyethylene oleyl ether, polyoxyethylene lauryl ether, and polyoxyalkylene alkyl ethers (e.g. polyoxyethylene alkyl ethers); and esters, such as polyoxyethylene oleate, polyoxyethylene oleate ester, polyoxyethylene distearate, sorbitan laurate, sorbitan monostearate, sorbitan mono-oleate, sorbitan sesquioleate, polyoxyethylene mono-oleate, and polyoxyethylene stearate. Acetylene glycol surface active agents, such as 2,4,7,9-tetramethyl-5-decyne-4,7-diol, 3,6-dimethyl-4-octyne-3,6-diol or 3,5-dimethyl-1-hexyn-3-ol, may also be used.

The inkjet ink may also include a biocide, such as benzoic acid, dichlorophene, hexachlorophene, sorbic acid, hydroxybenzoic esters, sodium dehydroacetate, 1,2-benthiazolin-3-one, 3,4-isothiazolin-3-one or 4,4-dimethyloxazolidine.

The inkjet ink may also contain a sequestering agent, such as ethylenediaminetetraacetic acid (EDTA).

The inkjet ink may also contain a singlet oxygen quencher. The presence of singlet oxygen quencher(s) in the ink reduces the propensity for the IR-absorbing dye to degrade. The quencher consumes any singlet oxygen generated in the vicinity of the dye molecules and, hence, minimizes their degradation. An excess of singlet oxygen quencher is advantageous for minimizing degradation of the dye and retaining its IR-absorbing properties over time. Preferably, the singlet oxygen quencher is selected from ascorbic acid, 1,4-diazabicyclo-[2.2.2]octane (DABCO), azides (e.g. sodium azide), histidine or tryptophan.

Substrates

As mentioned above, the dyes of the present invention are especially suitable for use in Hyperlabel™ and netpage systems. Such systems are described in more detail below and in the patent applications listed above, all of which are incorporated herein by reference in their entirety.

The ozonefastness of the dye salts described above is most evident when the dyes are printed onto a substrate. Visible or colored dyes may be printed onto a plethora of suitable substrates (e.g. paper) as will be well-known to the person skilled in the art.

In the case of Hyperlabel™ and netpage application, the substrate an IR dye is disposed in the form of a coding pattern readable by an optically imaging sensing device. An example of a suitable coding pattern is described in U.S. Pat. No. 6,832,717, the contents of which is herein incorporated by reference. Typically, the coding pattern is disposed over a substantial portion of an interface surface of the substrate (e.g. greater than 20%, greater than 50% or greater than 90% of the surface).

Preferably, the substrate is IR reflective so that the dye disposed thereon may be read by a sensing device. The substrate may be comprised of any suitable material such as plastics (e.g. polyolefins, polyesters, polyamides etc.), paper, metal or combinations thereof. The substrate may be laminated.

For netpage applications, the substrate is preferably a paper sheet. For Hyperlabel™ applications, the substrate is preferably a tag, a label, a packaging material or a surface of a product item. Typically, tags and labels are comprised of plastics, paper or combinations thereof.

Netpage and Hyperlabel™

In brief summary, one form of the netpage system employs a computer interface in the form of a mapped surface, that is, a physical surface which contains references to a map of the surface maintained in a computer system. The map references can be queried by an appropriate sensing device. Depending upon the specific implementation, the map references may be encoded visibly or invisibly, and defined in such a way that a local query on the mapped surface yields an unambiguous map reference both within the map and among different maps. The computer system can contain information about features on the mapped surface, and such information can be retrieved based on map references supplied by a sensing device used with the mapped surface. The information thus retrieved can take the form of actions which are initiated by the computer system on behalf of the operator in response to the operator's interaction with the surface features.

In its preferred form, the netpage system relies on the production of, and human interaction with, netpages. These are pages of text, graphics and images printed on ordinary paper, but which work like interactive webpages. Information is encoded on each page using ink which is substantially invisible to the unaided human eye. The ink, however, and thereby the coded data, can be sensed by an optically imaging sensing device and transmitted to the netpage system. The sensing device may take the form of a clicker (for clicking on a specific position on a surface), a pointer having a stylus (for pointing or gesturing on a surface using pointer strokes), or a pen having a marking nib (for marking a surface with ink when pointing, gesturing or writing on the surface). References herein to "pen" or "netpage pen" are provided by way of example only. It will, of course, be appreciated that the pen may take the form of any of the sensing devices described above.

In one embodiment, active buttons and hyperlinks on each page can be clicked with the sensing device to request information from the network or to signal preferences to a network server. In one embodiment, text written by hand on a netpage is automatically recognized and converted to computer text in the netpage system, allowing forms to be filled in. In other embodiments, signatures recorded on a netpage are automatically verified, allowing e-commerce transactions to be securely authorized. In other embodiments, text on a netpage may be clicked or gestured to initiate a search based on keywords indicated by the user.

As illustrated in FIG. 1, a printed netpage 1 can represent a interactive form which can be filled in by the user both physically, on the printed page, and "electronically", via communication between the pen and the netpage system. The example shows a "Request" form containing name and address fields and a submit button. The netpage 1 consists of graphic data 2, printed using visible ink, and a surface coding pattern 3 superimposed with the graphic data. The surface coding pattern 3 comprises a collection of tags 4. One such tag 4 is shown in the shaded region of FIG. 1, although it will be appreciated that contiguous tags 4, defined by the coding pattern 3, are densely tiled over the whole netpage 1.

The corresponding page description 5, stored on the netpage network, describes the individual elements of the netpage. In particular it describes the type and spatial extent (zone) of each interactive element (i.e. text field or button in the example), to allow the netpage system to correctly interpret input via the netpage. The submit button 6, for example, has a zone 7 which corresponds to the spatial extent of the corresponding graphic 8.

Figure 2:
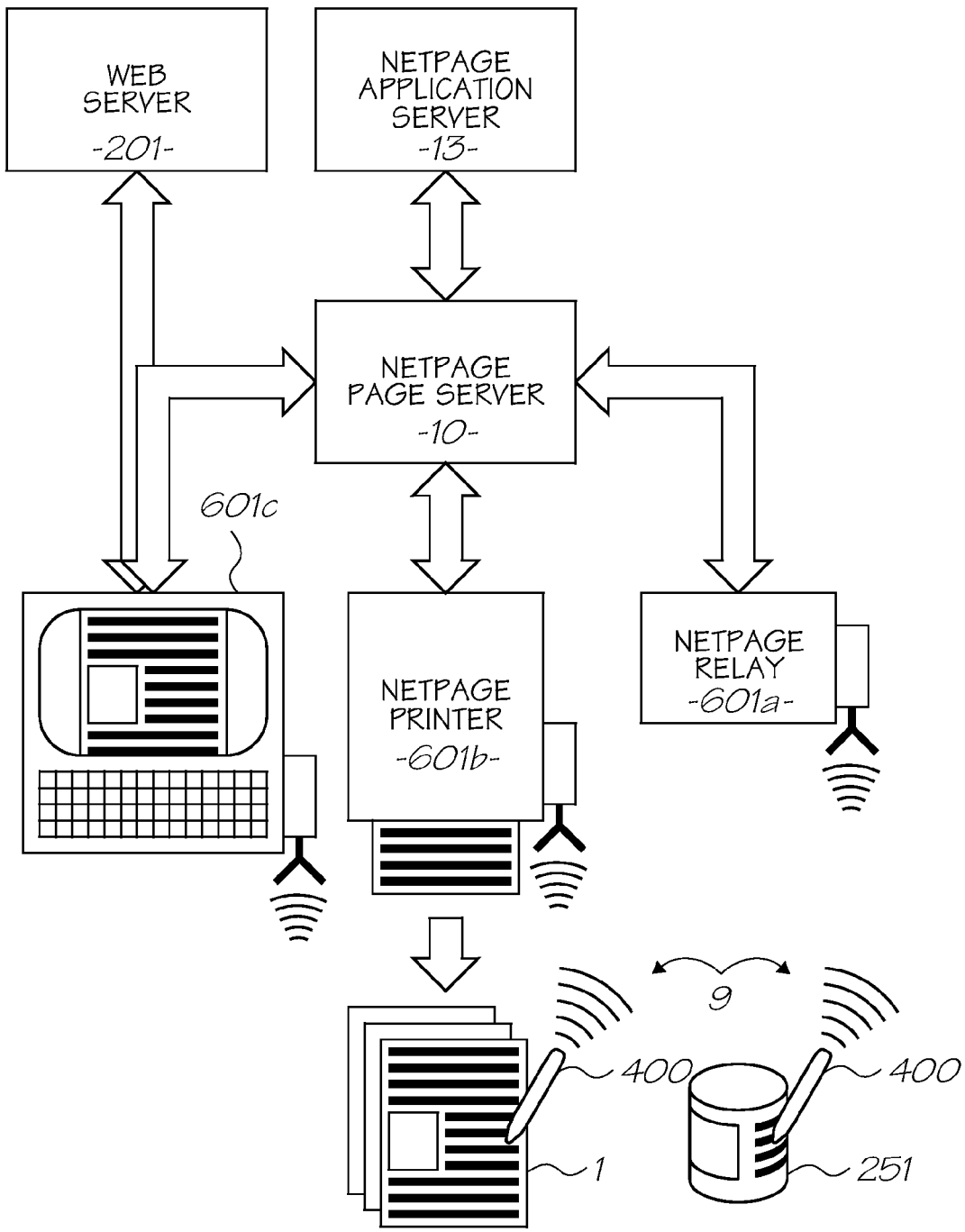
FIG. 2 is a schematic view of a interaction between a netpage pen, a Web terminal, a netpage printer, a netpage relay, a netpage page server, and a netpage application server, and a Web server.

As illustrated in FIG. 2, a netpage sensing device 400, such as the pen described in Section 3, works in conjunction with a netpage relay device 601, which is an Internet-connected device for home, office or mobile use. The pen 400 is wireless and communicates securely with the netpage relay device 601 via a short-range radio link 9. In an alternative embodiment, the netpage pen 400 utilises a wired connection, such as a USB or other serial connection, to the relay device 601.

The relay device 601 performs the basic function of relaying interaction data to a page server 10, which interprets the interaction data. As shown in FIG. 2, the relay device 601 may, for example, take the form of a personal computer 601a, a netpage printer 601b or some other relay 601c (e.g. personal computer or mobile phone incorporating a web browser).

The netpage printer 601b is able to deliver, periodically or on demand, personalized newspapers, magazines, catalogs, brochures and other publications, all printed at high quality as interactive netpages. Unlike a personal computer, the netpage printer is an appliance which can be, for example, wall-mounted adjacent to an area where the morning news is first consumed, such as in a user's kitchen, near a breakfast table, or near the household's point of departure for the day. It also comes in tabletop, desktop, portable and miniature versions. Netpages printed on-demand at their point of consumption combine the ease-of-use of paper with the timeliness and interactivity of an interactive medium.

Alternatively, the netpage relay device 601 may be a portable device, such as a mobile phone or PDA, a laptop or desktop computer, or an information appliance connected to a shared display, such as a TV. If the relay device 601 is not a netpage printer 601b which prints netpages digitally and on demand, the netpages may be printed by traditional analog printing presses, using such techniques as offset lithography, flexography, screen printing, relief printing and rotogravure, as well as by digital printing presses, using techniques such as drop-on-demand inkjet, continuous inkjet, dye transfer, and laser printing.

As shown in FIG. 2, the netpage sensing device 400 interacts with a portion of the tag pattern on a printed netpage 1, or other printed substrate such as a label of a product item 251, and communicates, via a short-range radio link 9, the interaction to the relay device 601. The relay 601 sends corresponding interaction data to the relevant netpage page server 10 for interpretation. Raw data received from the sensing device 400 may be relayed directly to the page server 10 as interaction data. Alternatively, the interaction data may be encoded in the form of an interaction URI and transmitted to the page server 10 via a user's web browser 601c. The web browser 601c may then receive a URI from the page server 10 and access a webpage via a webserver 201. In some circumstances, the page server 10 may access application computer software running on a netpage application server 13.

The netpage relay device 601 can be configured to support any number of sensing devices, and a sensing device can work with any number of netpage relays. In the preferred implementation, each netpage sensing device 400 has a unique identifier. This allows each user to maintain a distinct profile with respect to a netpage page server 10 or application server 13.

Digital, on-demand delivery of netpages 1 may be performed by the netpage printer 601*b*, which exploits the growing availability of broadband Internet access. Netpage publication servers 14 on the netpage network are configured to deliver print-quality publications to netpage printers. Periodical publications are delivered automatically to subscribing netpage printers via pointcasting and multicasting Internet protocols. Personalized publications are filtered and formatted according to individual user profiles.

A netpage pen may be registered with a netpage registration server 11 and linked to one or more payment card accounts. This allows e-commerce payments to be securely authorized using the netpage pen. The netpage registration server compares the signature captured by the netpage pen with a previously registered signature, allowing it to authenticate the user's identity to an e-commerce server. Other biometrics can also be used to verify identity. One version of the netpage pen includes fingerprint scanning, verified in a similar way by the netpage registration server.

Netpages are the foundation on which a netpage network is built. They provide a paper-based user interface to published information and interactive services.

As shown in FIG. 1, a netpage consists of a printed page (or other surface region) invisibly tagged with references to an online description 5 of the page. The online page description 5 is maintained persistently by the netpage page server 10. The page description describes the visible layout and content of the page, including text, graphics and images. It also describes the input elements on the page, including buttons, hyperlinks, and input fields. A netpage allows markings made with a netpage pen on its surface to be simultaneously captured and processed by the netpage system.

Multiple netpages (for example, those printed by analog printing presses) can share the same page description. However, to allow input through otherwise identical pages to be distinguished, each netpage may be assigned a unique page identifier. This page ID has sufficient precision to distinguish between a very large number of netpages.

Each reference to the page description 5 is repeatedly encoded in the netpage pattern. Each tag (and/or a collection of contiguous tags) identifies the unique page on which it appears, and thereby indirectly identifies the page description 5. Each tag also identifies its own position on the page. Characteristics of the tags are described in more detail below.

Tags are typically printed in infrared-absorptive ink on any substrate which is infrared-reflective, such as ordinary paper, or in infrared fluorescing ink. Near-infrared wavelengths are invisible to the human eye but are easily sensed by a solid-state image sensor with an appropriate filter.

A tag is sensed by a 2D area image sensor in the netpage sensing device, and the tag data is transmitted to the netpage system via the nearest netpage relay device 601. The pen 400 is wireless and communicates with the netpage relay device 601 via a short-range radio link. It is important that the pen recognize the page ID and position on every interaction with the page, since the interaction is stateless. Tags are error-correctably encoded to make them partially tolerant to surface damage.

The netpage page server 10 maintains a unique page instance for each unique printed netpage, allowing it to maintain a distinct set of user-supplied values for input fields in the page description 5 for each printed netpage 1.

A more detailed description of the netpage system can be found in the above-mentioned cross-referenced documents (see, for example, US 2007/130117 and US 2007/108285, the contents of which are herein incorporated by reference).

Hyperlabel™

Hyperlabel™ uses an invisible (e.g. infrared) tagging scheme to uniquely identify a product item. This has the significant advantage that it allows the entire surface of a product to be tagged, or a significant portion thereof, without impinging on the graphic design of the product's packaging or labelling. If the entire product surface is tagged, then the orientation of the product doesn't affect its ability to be scanned, i.e. a significant part of the line-of-sight disadvantage of a visible bar code is eliminated. Furthermore, since the tags are small and massively replicated, label damage no longer prevents scanning.

Hyperlabel tagging, then, consists of covering a large proportion of the surface of a product item with optically-readable invisible tags. Each Hyperlabel tag uniquely identifies the product item on which it appears. The Hyperlabel may directly encode the product code (e.g. EPC) of the item, or may encode a surrogate ID which in turn identifies the product code via a database lookup. Each Hyperlabel tag also optionally identifies its own position on the surface of the product item, to provide the downstream consumer benefits of netpage interactivity described earlier.

Hyperlabel tags are applied during product manufacture and/or packaging using digital printers. These may be add-on infrared printers which print the Hyperlabel tags after the text and graphics have been printed by other means, or integrated color and infrared printers which print the Hyperlabel tags, text and graphics simultaneously. Digitally-printed text and graphics may include everything on the label or packaging, or may consist only of the variable portions, with other portions still printed by other means.

For a more detailed description of Hyperlabel™, reference is made to the above-mentioned cross-referenced documents (see, for example, U.S. Pat. No. 7,225,979, the contents of which is herein incorporated by reference).

The invention will now be described with reference to the following examples. However, it will of course be appreciated that this invention may be embodied in many other forms without departing from the scope of the invention, as defined in the accompanying claims.

EXAMPLES

In our earlier U.S. application Ser. No. 11/849,360, filed on Oct. 16, 2006), the contents of which are herein incorporated by reference, we described the preparation of various salts of gallium naphthalocyanine tetrasulfonic acid. The skilled person will readily appreciate that salts according to the present invention may be readily prepared from corresponding sulfonic acids by conventional methods.

Example 1

Tetra(benzyltrimethylammonium) salt

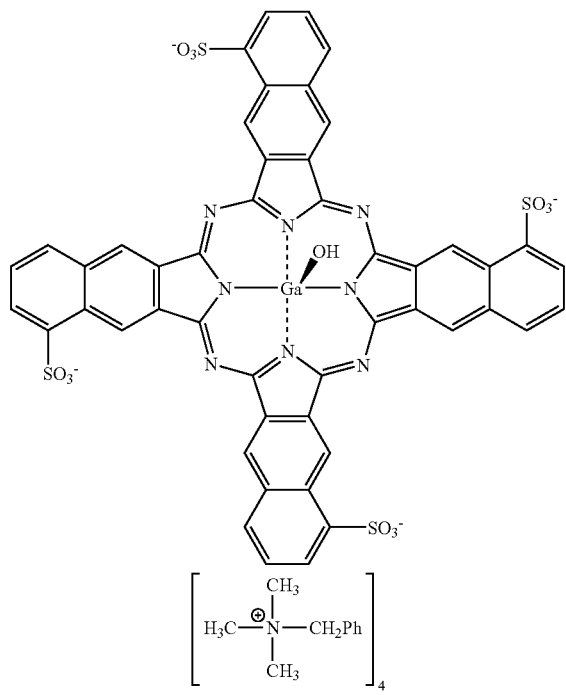

A mixture of hydroxygallium(III) naphthalocyaninetetrasulfonic acid (1.96 g, 1.75 mmol) and benzyltrimethylammonium chloride (1.57 g, 8.43 mmol) in water (20 mL) and methanol (100 mL) was evaporated to dryness with heating and stirring under a stream of nitrogen. The solid was suspended in hot water (200 mL) and filtered, washed with hot water (2×200 mL), and allowed to dry. The solid was then washed with acetone (3×200 mL) and diethyl ether (1×200 mL) and dried to give the product as a dark-green powder (2.08 g, 70%).

$^1$H NMR (d$_6$-DMSO) ☐ 3.07 (36H, s); 4.57 (8H, s); 7.5-11.1 (40H, m).

Example 2

Tetra(1-methyl-3-octylimidazolium) salt

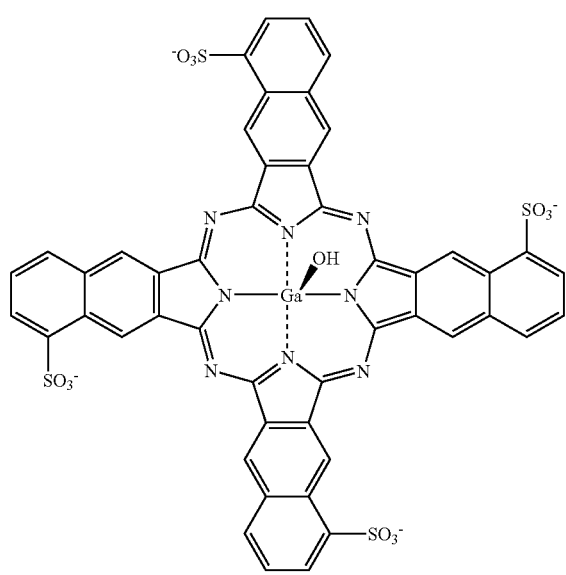

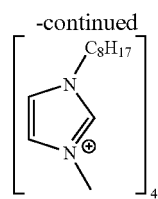

To a solution of hydroxygallium(III) naphthalocyaninetetrasulfonic acid (2.33 g, 2.08 mmol) in water (20 mL) and methanol (100 mL) was added a solution of 1-methyl-3-octylimidazolium chloride (1.90 mL, 1.92 g, 8.32 mmol) in methanol (20 mL). The reaction mixture was evaporated to half volume with heating under a stream of nitrogen and diluted with water (100 mL). The solid was filtered off and washed with hot water (3×250 mL) and hot acetone/water (50:50, 3×200 mL) and allowed to dry. The solid was then washed with ether (250 mL) and boiling hexane (250 mL) and dried to give the product as a dark-green powder (3.10 g, 79%).

$^1$H NMR (d$_6$-DMSO) ☐ 0.87 (12H, t, J=6.3 Hz); 1.23 (40H, m); 1.77 (8H, m); 3.86 (12H, s); 4.14 (8H, t, J=7.2 Hz); 7.69 (4H, s); 7.75 (4H, s); 9.14 (4H, s); 7.9-11.2 (20H, m).

Example 3

Tetrakis(1-allyl-3-methylimidazolium) salt

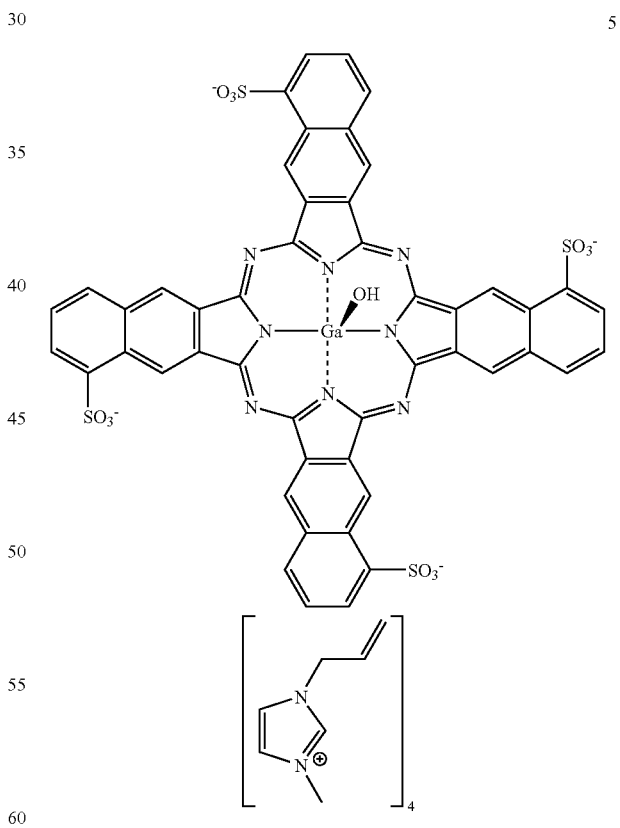

To a solution of hydroxygallium(III) naphthalocyaninetetrasulfonic acid (2.02 g, 1.80 mmol) in water (5 mL) and methanol (100 mL) was added a solution of 1-allyl-3-methylimidazolium chloride (1.32 g, 8.32 mmol) in methanol (10 mL) and then the reaction mixture was evaporated to dryness with heating under a stream of nitrogen. The solid was suspended in acetone (200 mL) and filtered, washed with acetone (2×200 mL) and dried to give the product as a dark-green powder (1.95 g, 67%).

$^1$H NMR (d$_6$-DMSO/CDCl$_3$) □ 3.50 (12H, s); 3.85 (8H, m); 4.84 (4H, d, J=6.3 Hz); 5.36 (4H, m); 6.02 (4H, m); 7.9-11.2 (20H, m).

Example 4

Tetrakis[(N-Geranyloxybutyl)imidazolium] salt (a) Preparation of geranyloxybutyl bromide 1,4-Dibromobutane (42.7 g, 198 mmol), geraniol (8.78 g, 56.9 mmol) and tetrabutylammonium w/v, 70 mL) was added with stirring. The reaction mixture was heated at reflux for 3 h under N$_2$. then left stirring under N$_2$ for a further two days. Heating at reflux was resumed for a further 20 h and then the reaction mixture was cooled to room temperature and diluted with hexane (80 mL) and water (80 ml). The product was partitioned into the hexane layer and then the water layer was extracted with ether (2×20 mL). The combined organic layers were dried (Na$_2$SO$_4$) and the solvent was removed under reduced pressure to give a pale yellow oil. The oil was distilled under high vacuum (Kugelrohr) to remove the remaining dibromobutane thereby leaving the product as a yellow/orange oil (58 g).

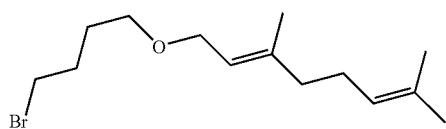

6

(b) Preparation of N-(geranyloxybutyl)imidazole

Sodium hydride (1.1 g 60% dispersion in oil, 0.66 g, 27.5 mmol) was weighed out in a 100 mL round bottom flask. The sodium hydride was washed with hexane (3×5 mL) to remove the mineral oils. DMF (anhydrous, 20 mL) was added, followed by geranyloxybutyl bromide (1.51 g, 5.47 mmol). The reaction mixture was stirred at room temperature under N$_2$ for a couple of minutes. Imidazole (1.84 g, 103 mmol, 27.1 equiv) was added slowly in small portions while cooling in an ice bath. The addition of imidazole was exothermic and the reaction mixture bubbled vigorously becoming initially a milky off-white and then clear brown in colour. This was left stirring at room temperature overnight. The reaction mixture was diluted with chloroform (50 mL) and then it was washed with brine (3×50 mL), and dried (Na$_2$SO$_4$). The solvent was removed under reduced pressure followed by high vacuum to give the product as a brown oil (1.37 g, 90%).

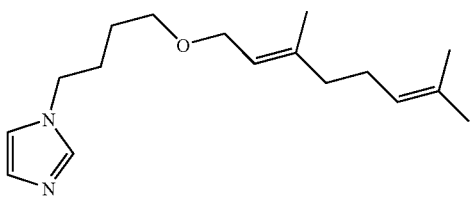

7

(c) Preparation of the Sulfonate Salt

N-(Geranyloxybutyl)imidazole (8.06 g, 29.2 mmol) was weighed out in a 250 mL round bottom flask. The tetrasulfonic acid (4.66 g, 4.17 mmol) was added, followed by MeOH/water (4:1, 50 mL) and then the reaction mixture was stirred at room temperature under N$_2$ for 6 h. The resulting mixture was poured slowly into ether (100 mL) while stirring vigorously giving the product as a fine precipitate. The green solid was filtered and washed with ether (2×100 mL) and then further triturated with ether (100 mL) at room temperature for 20 h. The product was filtered off under gravity initially and then with suction before being air-dried for a few hours. After drying under high vacuum the sulfonate salt was obtained as a dark green fine powder (7.4 g; 80%).

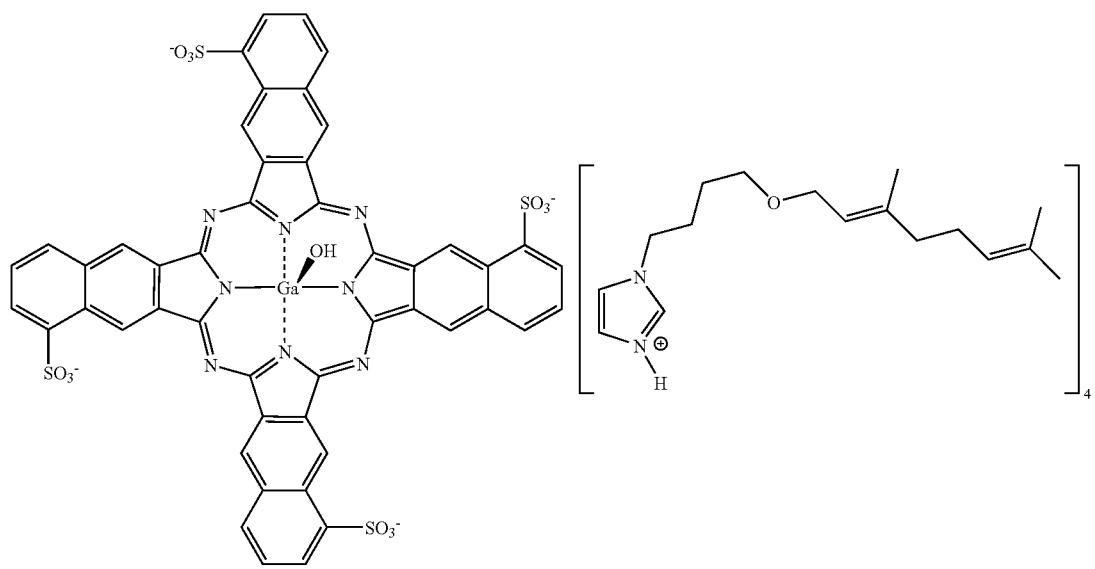

8

Example 5

Tetrakis{N-(3,7-dimethyloctanyl)oxybutyl]imidazolium} salt (a) Preparation of (3,7-dimethyloctanyl)oxybutyl bromide 1,4-Dibromobutane (22.7 g, 105 mmol), 3,7-dimethyloctanol (4.99 g, 31.5 mmol) and tetrabutylammonium bromide (585 mg, 1.81 mmol) were dissolved in hexane (40 mL). Sodium hydroxide solution (50% w/v, 40 mL) was added to the reaction mixture and then the whole was heated at reflux for 2 d. The reaction mixture was cooled to room temperature, diluted with hexane (40 mL) and water (40 mL) and transferred to a separatory funnel. The product was extracted into the organic layer and the aqueous layer was further extracted with ether (3×20 mL). The combined organic layers were dried (Na$_2$SO$_4$) and the solvent was removed under reduced pressure. The dibromobutane in the crude product was removed under reduced pressure and heating at 120° C. under high vacuum (Kugelrohr). This gave the product as a honey-coloured oil (6.24 g, 68%).

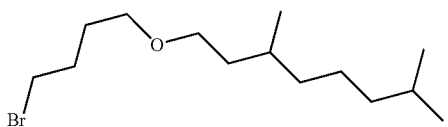

9

(b) Preparation of N-[(3,7-dimethyloctanyl)oxybutyl]imidazole

Sodium hydride (1.79 g 60% dispersion in oil, 1.07 g, 44.8 mmol) was weighed out in a 250 mL round bottom flask. The mineral oils were washed out with hexane (3×15 mL). DMF (30 mL) was added, followed by (3,7-dimethyloctanyl)oxybutyl bromide (3 g, 10.2 mmol) and then the reaction mixture was stirred at room temperature under N$_2$ for a couple of minutes. Imidazole (3.50 g, 51.4 mmol) was added in portions while cooling the reaction mixture in an ice bath. The addition of the imidazole was exothermic causing the mixture to become a milky off-white and then clear yellow in colour after complete addition of the imidazole. Stirring was continued under N$_2$ at room temperature for 3 d. The reaction mixture was diluted with chloroform (100 mL) to form a thick cloudy mixture and washed with water (2×50 mL). The organic layer was dried (Na$_2$SO$_4$) and the solvent was removed at reduced pressure and then under high vacuum to give the product as a brown clear oil (3.38 g).

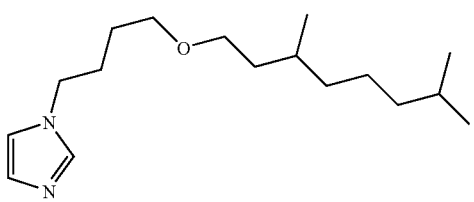

10

(c) Preparation of the Sulfonate Salt

N-(3,7-Dimethyloctanyl)oxybutylimidazole (2.07 g, 7.38 mmol) was weighed out in a 100 mL round bottom flask. The tetrasulfonic acid (1.17 g, 1.04 mmol) was added to the round bottom flask, followed by a MeOH/water solution (4:1, 20 mL) and then the reaction mixture was stirred at room temperature under N$_2$ for 20 h. The reaction mixture was poured slowly into ether (50 mL) with vigorous stirring and precipitated as a very fine dark green product. The product was filtered, washed with ether and air dried. The resulting solid was triturated in ether (60 mL) at room temperature for 20 h. Filtration, air drying and further drying under high vacuum gave the product as a dark green fine powder (865 mg, 37%).

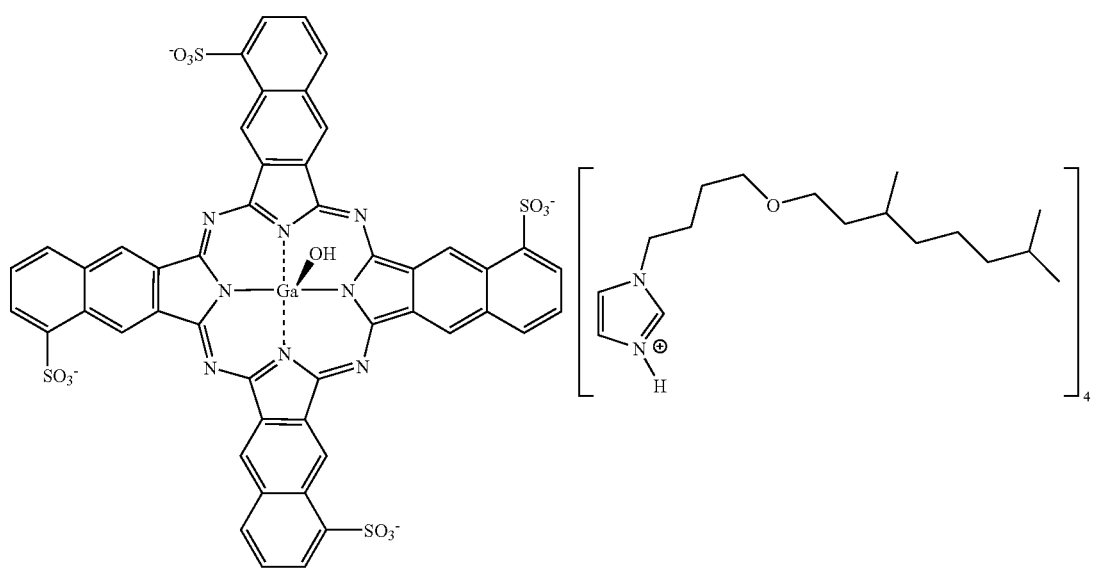

11

Example 6

Tetra(1-benzyl-2-methylimidazolium) salt

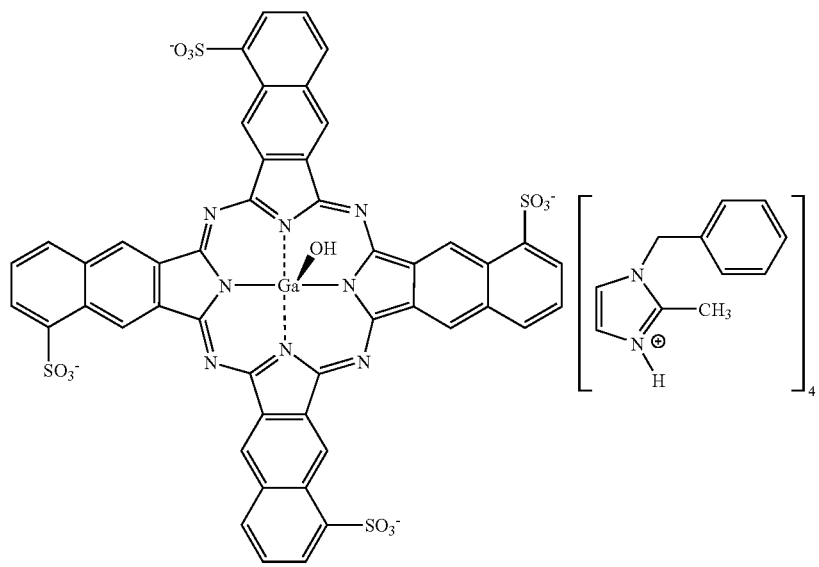

To a solution of hydroxy gallium(III) naphthalocyaninetetrasulfonic acid (2.60 g, 2.33 mmol) in water (5 mL) and methanol (100 mL) was added 1-benzyl-2-methylimidazole (2.0 mL, 2.16 g, 0.013 mol) and then the reaction mixture was evaporated to dryness with heating and stirring under a stream of nitrogen. The residue was suspended in water (200 mL) and filtered, washed with water (2×200 mL) and air-dried. The solid was then washed with diethyl ether (2×200 mL) and dried to give the product as a green powder (2.95 g, 70%).

$^1$H NMR (d$_6$-DMSO) □ 2.57 (12H, s); 5.37 (8H, s); 7.30-7.45 (20H, m); 7.55 (4H, d, J=2.1 Hz); 7.63 (4H, d, J=2.1 Hz); 8.0-11.5 (20H, m).

Example 7

Tetra(benzimidazolium) salt

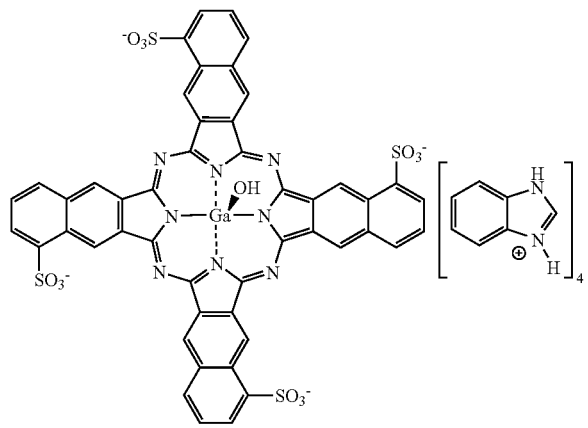

To a solution of hydroxygallium(III) naphthalocyaninetetrasulfonic acid (2.19 g, 1.952 mmol) in water (10 mL) and methanol (100 mL) was added benzimidazole (1.66 g, 0.014 mol) and then the reaction mixture was concentrated to dryness under a stream of nitrogen with warming. Cold water (200 mL) was added to the residue and the product was filtered off and washed with water (2×200 mL) and air-dried. The solid was then washed with diethyl ether (2×200 mL) and dried to give the product as a dark green powder (2.10 g, 66%).

$^1$H NMR (d$_6$-DMSO) □ 7.55 (8H, m); 7.80 (8H, m); 9.27 (4H, s); 8.0-11.5 (20H, m).

Example 8

Tetrakis(N-dimethylallylimidazolium) salt (a) Preparation of N-(dimethylallyl)imidazole Sodium hydride (1.37 g 60% dispersion in oil, 0.82 g; 34.2 mmol) was weighed out in a 100 mL round bottom flask, and washed with hexane (3×15 mL) to remove the mineral oils. DMF (anhydrous, 15 mL) was added to the sodium hydride and the whole was stirred at room temperature for a couple of minutes under N$_2$. 3,3-Dimethylallyl bromide (1.05 g, 7.02 mmol) was added to the reaction mixture, followed by slow addition of imidazole (2.28 g, 33.5 mmol) while cooling in an ice bath. The mixture was a milky cream colour initially, turning into a homogeneous brown solution. Stirring was continued at room temperature for 20 h. When the TLC showed complete consumption of the dimethylallyl bromide, the DMF was distilled off at 120° C. under high vacuum (Kugelrohr), leaving a viscous yellow heterogeneous mixture. This was triturated with chloroform to give a brown organic layer after removing the precipitated solids by filtration. The organic layer was washed with brine (3×20 mL), dried (Na$_2$SO$_4$) and the solvent was removed under reduced pressure and then under high vacuum. This gave the product as a dark brown oil (0.52 g, 54%).

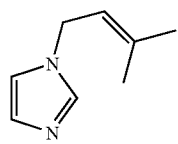

(b) Tetrakis[N-(3,3-dimethylallyl)imidazolium] salt

The tetrasulfonic acid (3.48 g, 3.11 mmol) was weighed out in a 100 mL round bottom flask. 3,3-(Dimethylallyl)imidazole (2.60 g, 19.1 mmol) was added to the flask, followed by MeOH/water (4:1, 20 mL). The reaction mixture turned dark green immediately and was left stirring at room temperature for 20 h. The resulting mixture was poured into ether (100 mL) to precipitate the product. Filtration, air-drying for a few hours, then further drying under high vacuum gave the product as a dark green powder (2.8 g, 54%).

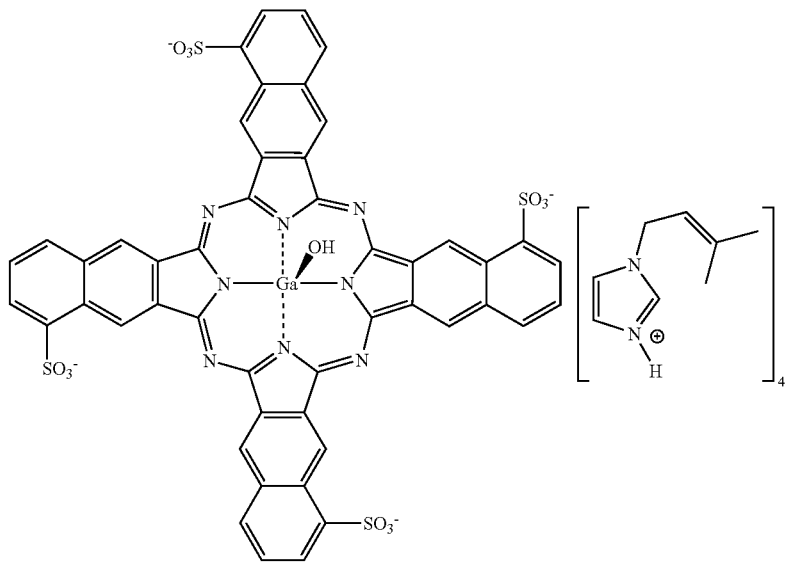

Example 9

Tetrakis(1,8-bis[tetramethylguanidino]naphthalene) salt

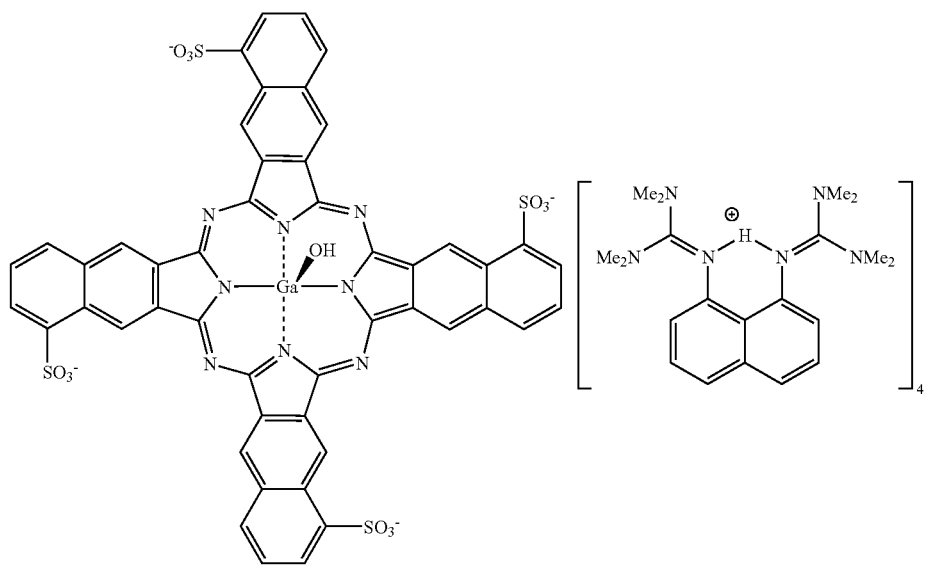

To a solution of hydroxygallium(III) naphthalocyaninetetrasulfonic acid (2.19 g, 1.952 mmol) in water (10 mL) and methanol (100 mL) was added 1,8-bis(tetramethylguanidino)naphthalene (3.17 g, 8.94 mmol) and then the reaction mixture was concentrated to dryness under a stream of nitrogen with warming. Water (200 mL) was added to the residue and the product was filtered off and washed with water (2×200 mL) and air-dried. The solid was then washed with acetone (2×200 mL) and tert-butyl methyl ether (2×200 mL), and dried to give the product as a green powder (1.90 g, 38%).

$^1$H NMR (d$_6$-DMSO) □ 2.87 (96H, s); 6.50 (8H, d, J=7.2 Hz); 7.30-7.45 (16H, m); 8.0-11.5 (20H, m).

Example 10

Tetra(thiabendazole) salt

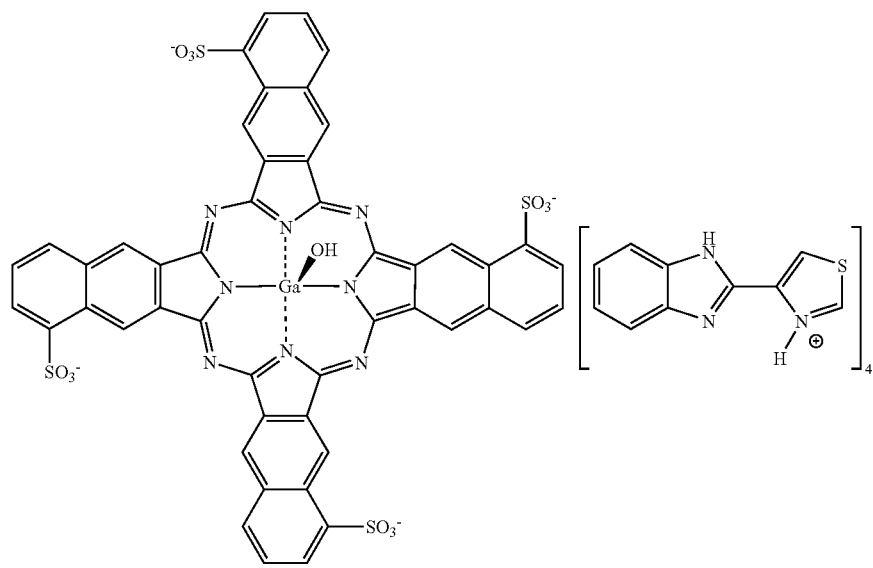

To a solution of hydroxygallium(III) naphthalocyaninetetrasulfonic acid (2.80 g, 2.501 mmol) in water (10 mL) and methanol (100 mL) was added thiabendazole (2.51 g, 0.0125 mol) and then the reaction mixture was stirred at 60° C. for 30 min and then concentrated to half volume under a stream of nitrogen. Water (100 mL) was added to precipitate the product which was filtered off and washed with water (200 mL), hot methanol (2×200 mL) and hot acetone (3×200 mL) and dried to give the product as a dark green powder (3.46 g, 72%).

$^1$H NMR (d$_6$-DMSO) □ 7.51 (8H, m); 7.78 (8H, m); 8.82 (4H, d, J=1.5 Hz); 9.47 (4H, d, J=1.5 Hz); 8.0-11.5 (20H, m).

Example 11

Tetrakis(bis[triphenylphosphino]iminium) salt

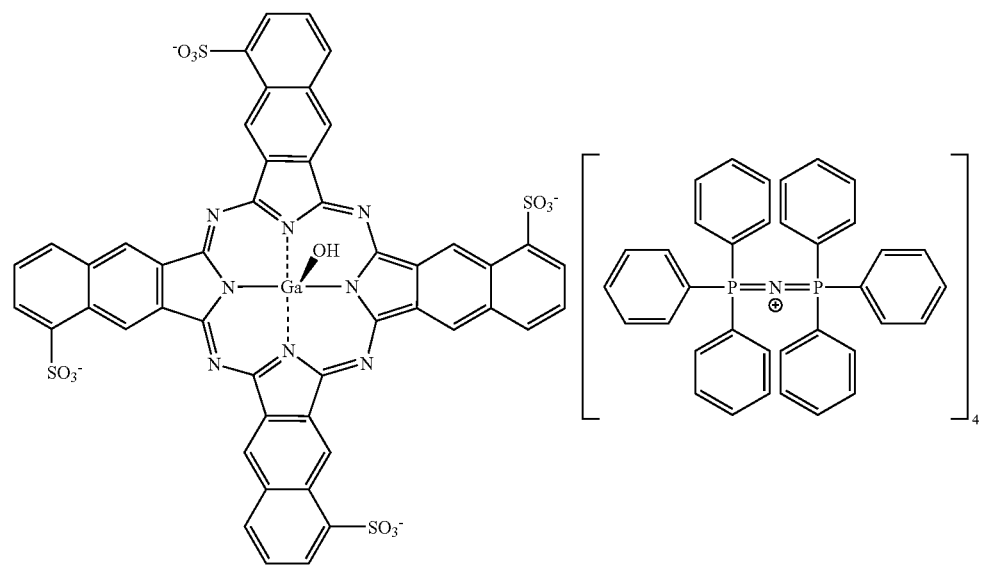

To a solution of hydroxygallium(III) naphthalocyaninetetrasulfonic acid (1.50 g, 1.34 mmol) in water (20 mL) and methanol (100 mL) was added a solution of bis(triphenylphosphine)iminium chloride (3.52 g, 6.13 mmol) in water (30 mL). The reaction mixture was evaporated to half volume with heating under a stream of nitrogen, diluted with water (100 mL) and the solid was filtered off and washed with hot water (3×300 mL), acetone/water (50:50, 2×300 mL) and acetone (2×200 mL) and dried to give the product as a dark-green powder (2.05 g, 47%).

Example 12

Tetrakis(tert-butylimino-tri[pyrrolidino]phosphorane) salt

To a solution of hydroxygallium(III) naphthalocyaninetetrasulfonic acid (1.78 g, 1.59 mmol) in water (5 mL) and methanol (20 mL) was added a solution of tert-butylimino-tri(pyrrolidino)phosphorane (2.0 mL, 2.0 g, 6.5 mmol) in methanol (20 mL). The reaction mixture was evaporated to dryness under a stream of nitrogen with heating and stirring. The solid was suspended in tert-butyl methyl ether (200 mL), filtered off, washed with tert-butyl methyl ether (2×200 mL), and dried to give the product as a green powder (2.41 g, 64%).

$^1$H NMR ($d_6$-DMSO) ☐ 1.21 (36H, s); 1.81 (48H, m); 3.12 (48H, m); 5.17 (4H, d, J=10.2 Hz); 7.9-11.2 (20H, m).

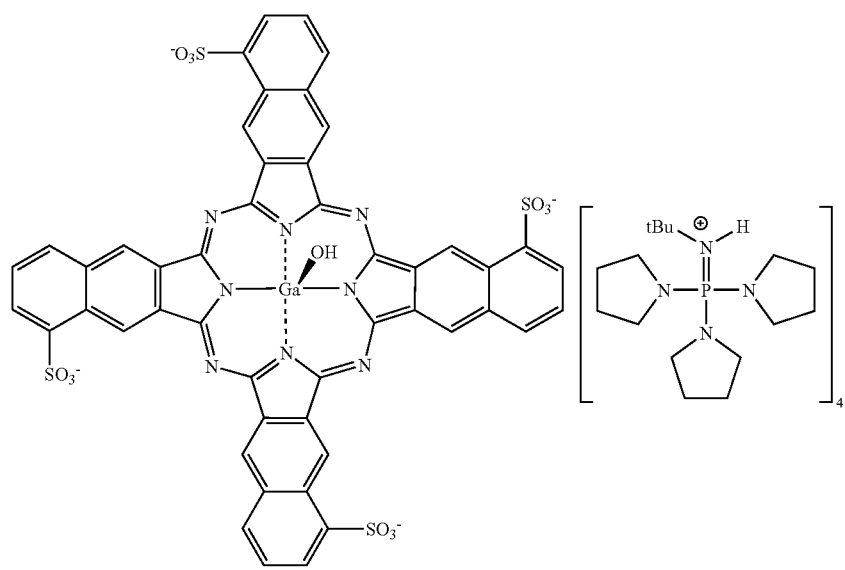

19

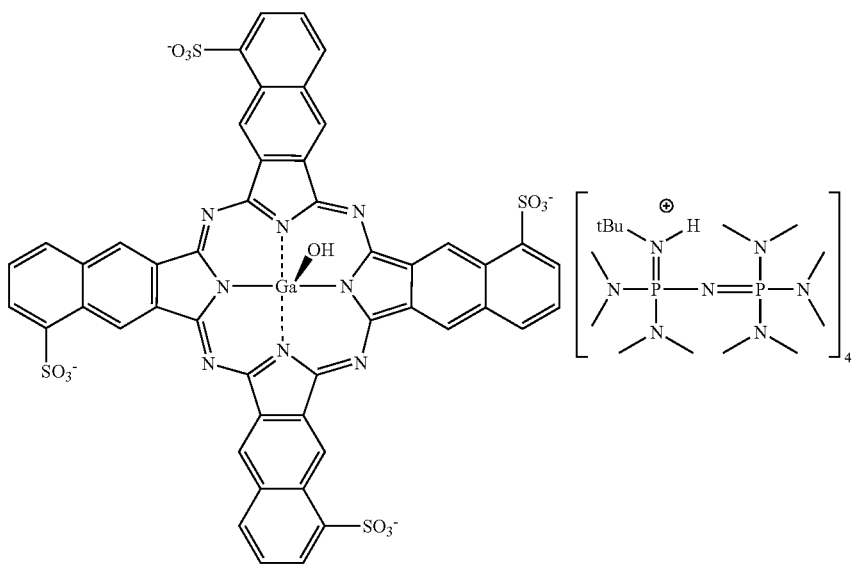

Example 13

Tetrakis(1-tert-butyl-2,2,4,4,4-pentakis[dimethylamino]-2$\Lambda^5$,4$\Lambda^5$-catenadi[phosphazene]) salt

20

To a solution of hydroxygallium(III) naphthalocyaninetetrasulfonic acid (491 mg, 0.439 mmol) in water (5 mL) and methanol (100 mL) was added a solution of 1-tert-butyl-2,2,4,4,4-pentakis(dimethylamino)-2Λ$^5$,4Λ$^5$-catenadi(phosphazene) in tetrahydrofuran (2.0 M, 1.0 mL, 2 mmol). The reaction mixture was evaporated to dryness under a stream of nitrogen with heating and stirring. The solid was suspended in tert-butyl methyl ether (200 mL), filtered off, washed with tert-butyl methyl ether (2×200 mL) and acetone (200 mL), and dried to give the product as a green powder (239 mg, 21%).

$^1$H NMR (d$_6$-DMSO) ☐ 1.20 (36H, s); 2.50-2.65 (120H, m); 4.55 (4H, d, J=11.7 Hz); 7.9-11.2 (20H, m).

Example 14

Tetrakis(1-tert-Butyl-4,4,4-tris[dimethylamino]-2,2-bis[tris(dimethylamino)-phosphoranyl-idenamino]-2Λ$^5$,4Λ$^5$-catenadi[phosphazene]) salt To a solution of hydroxygallium(III) naphthalocyaninetetrasulfonic acid (1.23 g, 1.09 mmol) in methanol (50 mL) was added a solution of 1-tert-butyl-4,4,4-tris(dimethylamino)-2,2-bis(tris[dimethylamino]-phosphoranylidenamino)-2Λ$^5$,4Λ$^5$-catenadi(phosphazene) in hexane (1.0 M, 5.0 mL, 5 mmol). The reaction mixture was evaporated to dryness under a stream of nitrogen with heating and stirring. The solid was suspended in water (200 mL), filtered off, washed with water (2×200 mL), and dried. The solid was then washed with hexane (2×200 mL), and dried to give the product as a green powder (2.99 g, 75%).

$^1$H NMR (d$_6$-DMSO) ☐ 1.26 (36H, s); 2.59 (108H, s); 2.63 (108H, s); 3.17 (4H, d, J=5.4 Hz); 7.9-11.2 (20H, m).

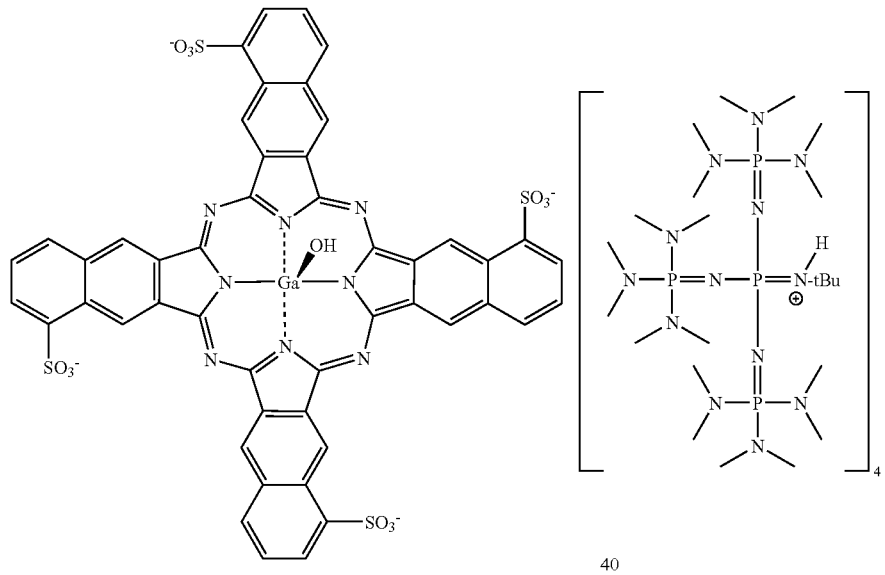

40

Example 15

Bis Chlorhexidine Salt

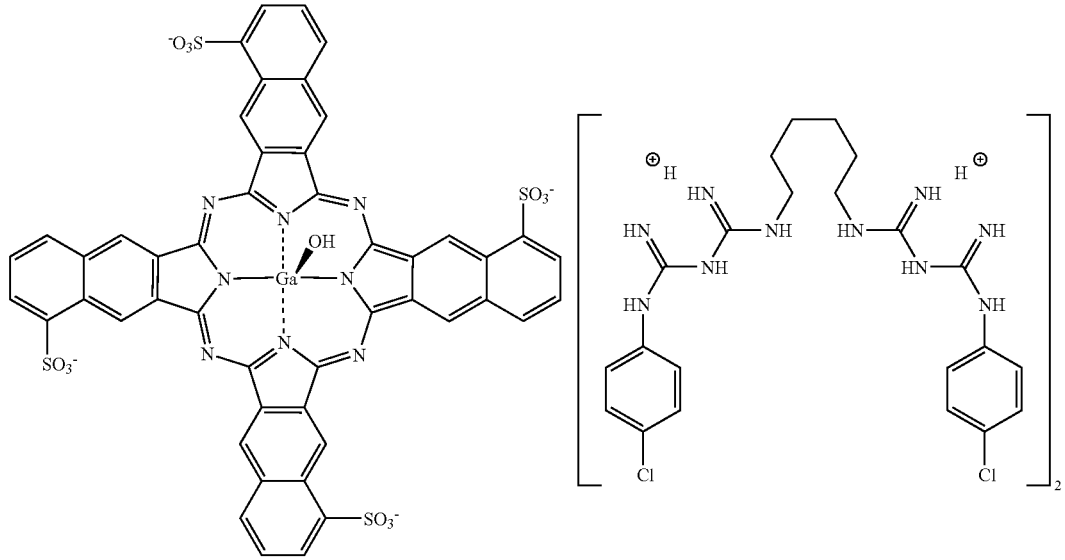

To a solution of hydroxygallium(III) naphthalocyaninetetrasulfonic acid (1.78 g, 1.59 mmol) in water (5 mL) and methanol (100 mL) was added a solution of chlorhexidine (1.42 g, 2.78 mmol) in methanol (20 mL). The reaction mixture was evaporated to dryness under a stream of nitrogen with heating and stirring. The solid was suspended in tert-butyl methyl ether (200 mL), filtered off, washed with acetone (2×200 mL) and tert-butyl methyl ether (2×200 mL), and dried to give the product as a green powder (1.79 g, 82%).

$^1$H NMR (d$_6$-DMSO) ⌐ 1.10-1.40 (16H, m); 2.99 (8H, m); 7.25 (16H, m); 7.9-11.2 (20H, m).

Example 16

Tetrakis(4-[N,N-dimethylamino]pyridinium) salt

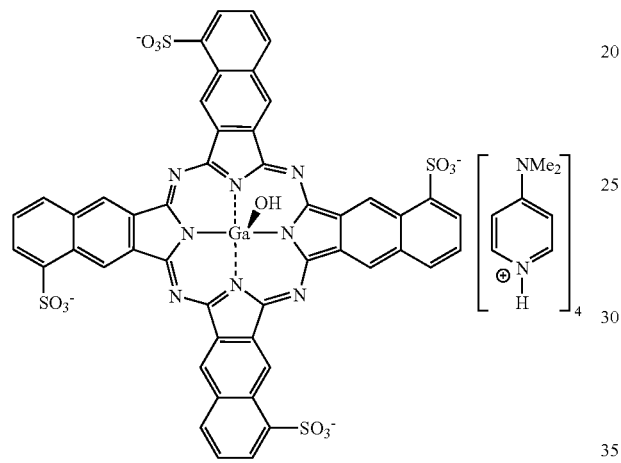

23

To a solution of hydroxygallium(III) naphthalocyaninetetrasulfonic acid tetrapyridinium salt (1.49 g, 1.04 mmol) in water (5 mL) and methanol (50 mL) was added a solution of 4-(N,N-dimethylamino)pyridine (526 mg, 4.31 mmol) in methanol (10 mL). The reaction mixture was evaporated to dryness under a stream of nitrogen with heating and stirring. The solid was suspended in acetone (200 mL), filtered off, washed with acetone (2×200 mL) and tert-butyl methyl ether (200 mL), and dried to give the product as a dark green powder (1.05 g, 63%).

$^1$H NMR (d$_6$-DMSO) ☐ 3.14 (24H, s); 6.92 (8H, d, J=7.5 Hz); 8.19 (8H, d, J=7.5 Hz); 7.9-11.2 (20H, m).

Comparative Example 1

Tetrakis(trioctylmethylammonium) Salt, Large Scale from Aliquat 336 (Mixture of Trioctylmethyl- and Tridecylmethylammonium)

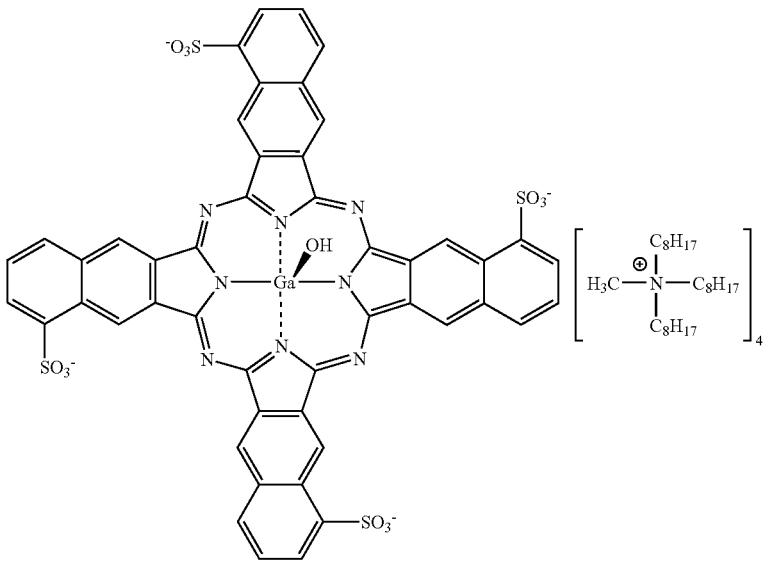

C1

To a solution of hydroxygallium(III) naphthalocyaninetetrasulfonic acid (36.4 g, 0.033 mol) in water (50 mL) and methanol (300 mL) was added a solution of Aliquat 336 (55.1 g, 0.136 mol) in methanol (50 mL). The solution was concentrated to half volume with stirring and heating under a stream of nitrogen and the concentrated solution was diluted with water (100 mL) to precipitate the product. The solid was filtered off and washed with warm acetone/water (50:50, 3×300 mL) and warm water (2×300 mL) and air dried. The solid was then washed with boiling hexane (2×300 mL) and dried to give the product as a green powder (42.8 g, 51%).

$^1$H NMR (d$_6$-DMSO) ☐ 0.85 (36H, m); 1.27 (120H, m); 1.60 (24H, m); 2.95 (12H, s); 3.15 (24H, m); 7.9-11.1 (20H, m).

Comparative Example 2

Tetrabenzethonium Salt

Comparative Example 3

Tetra(N-hexadecylpyridinium) salt

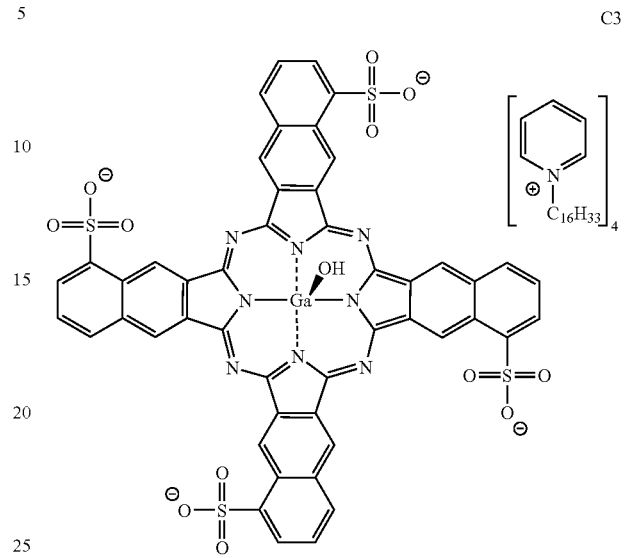

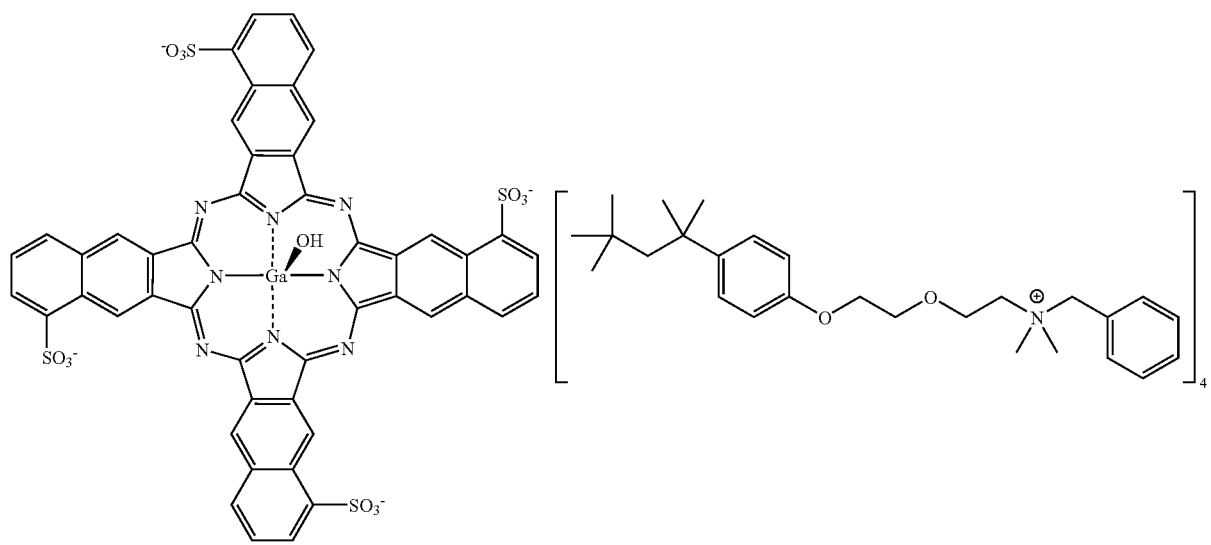

To a solution of hydroxygallium(III) naphthalocyaninetetrasulfonic acid (1.78 g, 1.59 mmol) in water (20 mL) and methanol (100 mL) was added a solution of benzyldimethyl-p-(1,1,3,3-tetramethylbutyl)phenoxyethoxyethylammonium chloride (Benzethonium chloride) (3.25 g, 7.25 mmol) in methanol (20 mL). The reaction mixture was evaporated to half volume with heating under a stream of nitrogen and diluted with water (100 mL). The solid was filtered off and washed with hot water (3×250 mL) and allowed to dry. The solid was then washed with diethyl ether (2×200 mL) and boiling hexane (1×200 mL) and dried to give the product as a green powder (2.78 g, 63%).

$^1$H NMR (d$_6$-DMSO) ☐ 0.66 (36H, s); 1.27 (24H, s); 1.67 (8H, s); 3.04 (24H, s); 3.18 (8H, d, J=5.4 Hz); 3.5-4.1 (32H, m); 4.61 (8H, s); 6.82 (8H, d, J=8.7 Hz); 7.25 (8H, d, J=8.7 Hz); 7.4-7.6 (20H, m); 7.9-11.2 (20H, m).

A mixture of hydroxygallium(III) naphthalocyaninetetrasulfonic acid (2.15 g, 1.92 mmol) and cetylpyridinium chloride (4.22 g, 0.012 mol) in water (20 mL) and methanol (100 mL) was evaporated to dryness with heating and stirring under a stream of nitrogen. The solid was suspended in acetone (200 mL), and filtered off. It was washed with water (2×200 mL), acetone (2×200 mL) and cold methanol (1×200 mL), and dried to give the product as a dark-green powder (3.09 g, 67%).

$^1$H NMR (d$_6$-DMSO) ☐ 0.85 (12H, t, J=6.6 Hz); 1.20 (104H, m); 1.89 (8H, m); 4.58 (8H, t, J=7.5 Hz); 7.9-11.1 (40H, m).

UV-Vis-NIR (DMSO): ☐$_{max}$ 791, 705, 342 nm.

Reflectance Spectra

Each salt was dissolved to give a concentration of 4 mM in an aqueous vehicle composed of 75% water, 25% organic solvents and 0.2% Surfynol 5. The organic solvent composition is given in Table 1.

TABLE 1

| Composition of organic solvents in the test vehicle used for the evaluation of the tetrasulfonate salts. | |
|---|---|
| Solvent | % w/v |
| 2-pyrrolidinone | 8 |
| ethylene glycol | 12 |
| glycerol | 5 |
| biocide | 0.2 |

The test inks were applied to plain paper by using a drawdown rod (#2.5) and reflectance spectra were recorded periodically at 810 nm.

Accelerated Ozonefastness Testing

Figure 3:
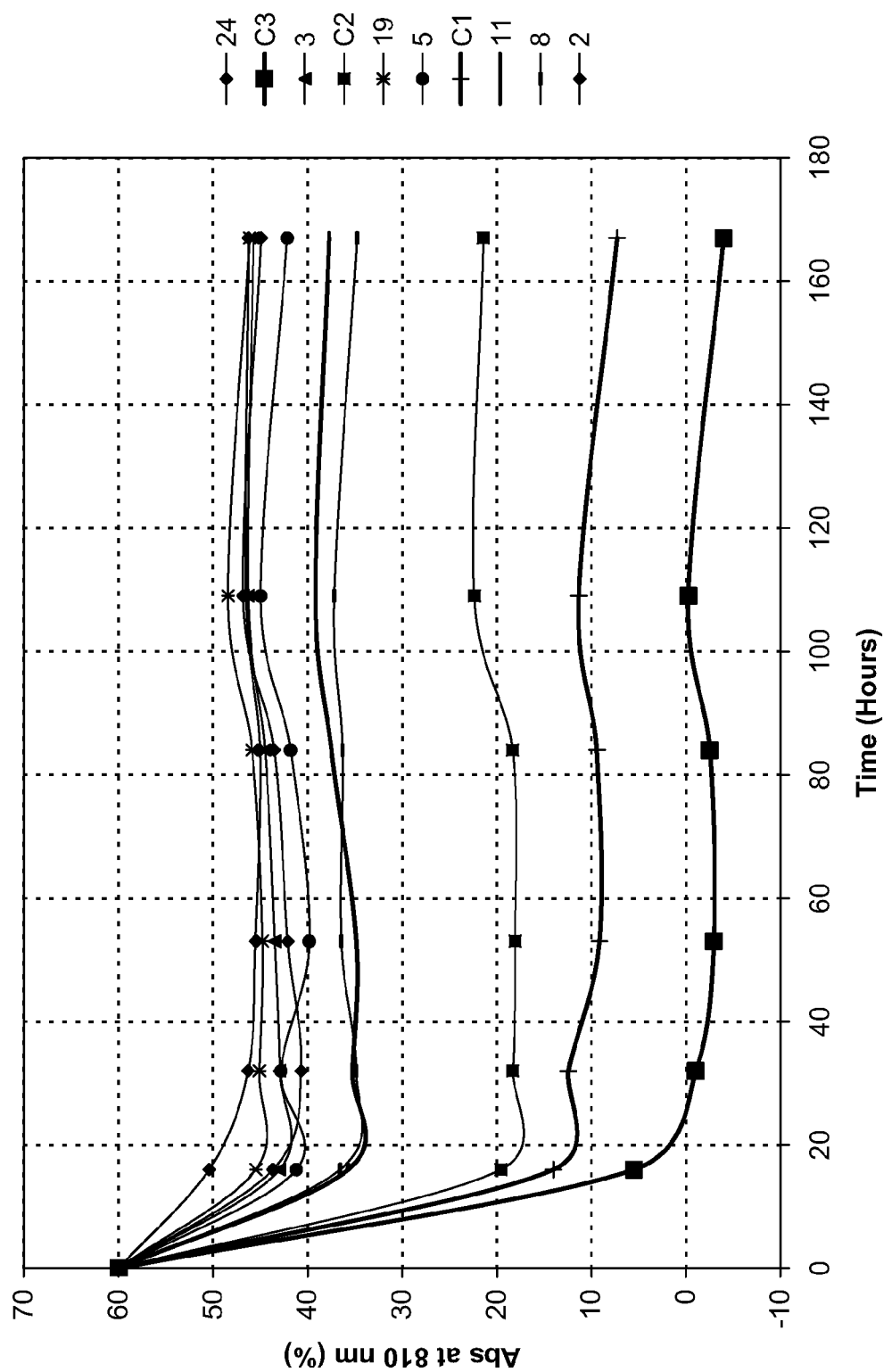
FIG. 3 shows the change in absorbance at 810 nm with time for drawdown samples of inks containing various tetrasulfonate salts at 4 mM on plain paper.

Samples were exposed to ozone (5 ppm) in an enclosed chamber and the change in absorbance at 810 nm was monitored with time. All samples showed a rapid drop during the first 20 h of exposure and then the rate of decrease in all cases dropped essentially to zero thereafter (FIG. 3). All sets of data are normalized to give a starting absorbance at t=0 of 60%.

As will be seen from FIG. 3, the salt compounds in accordance with the presented invention showed considerably improved ozonefastness compared to Comparative Examples C1, C2 and C3.

The invention claimed is:

1. A method of modulating a stability of a sulfonated phthalocyanine dye, said method comprising providing a salt of said phthalocyanine dye, wherein said salt comprises at least one phosphazene cation, and wherein said phosphazene cation is of formula (C):

(C)

wherein:
  $R^{15}$, $R^{16}$ and $R^{17}$ are each independently selected from $C_{6-12}$ aryl, $C_{5-12}$ heteroaryl; $N(R^{20})(R^{21})$ and $-N=P[N(R^{22})_2]_3$;
  $R^{18}$ and $R^{19}$ are each independently selected from H and $C_{1-8}$ alkyl; or $R^{18}$ and $R^{19}$ are together: $=P(Ph)_3$;
  $R^{20}$ and $R^{21}$ are each independently selected from H and $C_{1-8}$ alkyl; or $R^{20}$ and $R^{21}$ are together joined to form a nitrogen-containing $C_{5-10}$ heterocycloalkyl group; and
  $R^{22}$ is $C_{1-6}$ alkyl.

2. The method of claim 1, wherein said salt modulates an ozonefastness of said dye.

3. The method of claim 1, wherein said dye is an IR-absorbing dye.

4. The method of claim 1, wherein said salt is of formula (I):

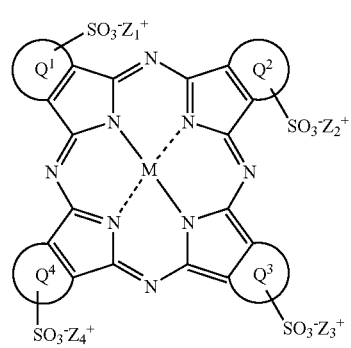

(I)

wherein:
  $Q^1$, $Q^2$, $Q^3$ and $Q^4$ are the same or different and are independently selected from a $C_{3-20}$ arylene group or a $C_{3-20}$ heteroarylene group;
  M is ($H_2$) or a metal selected from the group comprising: $Si(A^1)(A^2)$, $Ge(A^1)(A^2)$, $Ga(A^1)$, Mg, $Al(A^1)$, TiO, $Ti(A^1)(A^2)$, ZrO, $Zr(A^1)(A^2)$, VO, $V(A^1)(A^2)$, Mn, $Mn(A^1)$, Fe, $Fe(A^1)$, Co, Ni, Cu, Zn, Sn, $Sn(A^1)(A^2)$, Pb, $Pb(A^1)(A^2)$, Pd and Pt;
  $A^1$ and $A^2$ are axial ligands, which may be the same or different, and are selected from the group comprising: —OH, halogen, —$OR^3$, —$OC(O)R^4$ and —$O(CH_2CH_2O)_eR^e$ wherein e is an integer from 2 to 10 and $R^e$ is H, $C_{1-8}$ alkyl or $C(O)C_{1-8}$ alkyl;
  $R^3$ is $C_{1-20}$ alkyl, $C_{5-12}$ aryl, $C_{5-20}$ arylalkyl or $Si(R^x)(R^y)(R^z)$;
  $R^4$ is $C_{1-20}$ alkyl, $C_{5-12}$ aryl or $C_{5-20}$ arylalkyl;
  $R^x$, $R^y$ and $R^z$ are the same or different and are selected from $C_{1-12}$ alkyl, $C_{5-12}$ aryl, $C_{5-12}$ arylalkyl, $C_{1-12}$ alkoxy, $C_{5-12}$ aryloxy or $C_{5-12}$ arylalkoxy; and
  $Z_1^+$, $Z_2^+$, $Z_3^+$ and $Z_4^+$ may be the same or different and are each a phosphazene cation.

5. The method of claim 1, wherein said salt is of formula (II):

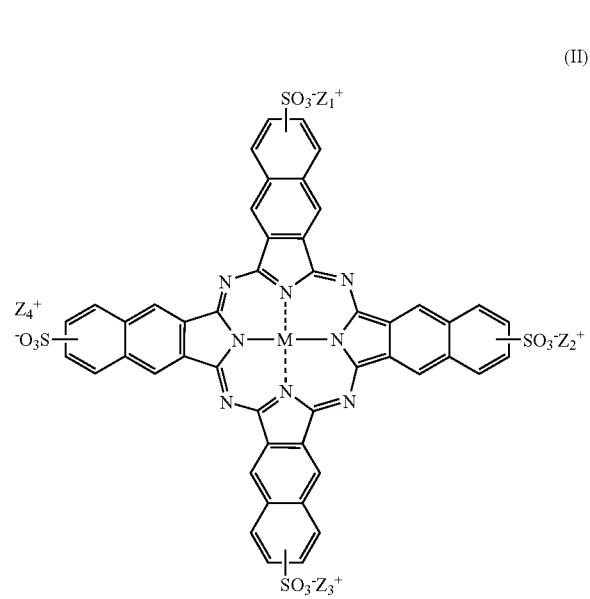

(II)

wherein
  M is ($H_2$) or a metal selected from the group comprising: $Si(A^1)(A^2)$, $Ge(A^1)(A^2)$, $Ga(A^1)$, Mg, $Al(A^1)$, TiO, Ti($A^1$)($A^2$), ZrO, Zr($A^1$)($A^2$), VO, V($A^1$)($A^2$), Mn, Mn($A^1$), Fe, Fe($A^1$), Co, Ni, Cu, Zn, Sn, Sn($A^1$)($A^2$), Pb, Pb($A^1$)($A^2$), Pd and Pt;

$A^1$ is an axial ligand selected from —OH, halogen, —$OR^3$, —OC(O)$R^4$ or O($CH_2CH_2O)_eR^e$ wherein e is an integer from 2 to 10 and $R^e$ is H, $C_{1-8}$ alkyl or C(O)$C_{1-8}$ alkyl;

$R^3$ is selected from $C_{1-12}$ alkyl, $C_{5-12}$ aryl, $C_{5-12}$ arylalkyl or Si($R^x$)($R^y$)($R^z$);

$R^4$ is selected from $C_{1-12}$ alkyl, $C_{5-12}$ aryl or $C_{5-12}$ arylalkyl;

$R^x$, $R^y$ and $R^z$ may be the same or different and are selected from $C_{1-12}$ alkyl, $C_{5-12}$ aryl, $C_{5-12}$ arylalkyl, $C_{1-12}$ alkoxy, $C_{5-12}$ aryloxy or $C_{5-12}$ arylalkoxy; and $Z_1^+$, $Z_2^+$, $Z_3^+$ and $Z_4^+$ may be the same or different and are each a phosphazene cation.

6. The method of claim 5, wherein M is Ga(OH).

7. The method of claim 1, wherein said dye is disposed on or in a substrate.

8. The method of claim 1, wherein said dye is printed onto a print medium.

9. The method of claim 1, wherein said print medium is paper.

* * * * *